United States Patent
Shin

(10) Patent No.: US 10,235,364 B2
(45) Date of Patent: Mar. 19, 2019

(54) INTERPRETATION DISTRIBUTING DEVICE, CONTROL DEVICE, TERMINAL DEVICE, INTERPRETATION DISTRIBUTING METHOD, CONTROL METHOD, INFORMATION PROCESSING METHOD, AND PROGRAM

(71) Applicant: SHIN TRADING CO., LTD., Osaka (JP)

(72) Inventor: Jungbum Shin, Osaka (JP)

(73) Assignee: SHIN TRADING CO., LTD., Osaka (JP)

( * ) Notice: Subject to any disclaimer, the term of this patent is extended or adjusted under 35 U.S.C. 154(b) by 0 days.

(21) Appl. No.: 15/565,977

(22) PCT Filed: Apr. 11, 2016

(86) PCT No.: PCT/JP2016/061672
§ 371 (c)(1),
(2) Date: Oct. 12, 2017

(87) PCT Pub. No.: WO2016/167210
PCT Pub. Date: Oct. 20, 2016

(65) Prior Publication Data
US 2018/0107657 A1    Apr. 19, 2018

(30) Foreign Application Priority Data
Apr. 14, 2015  (JP) .................................. 2015-082135

(51) Int. Cl.
*G06F 17/28* (2006.01)
*G10L 15/00* (2013.01)
*G10L 15/30* (2013.01)

(52) U.S. Cl.
CPC .......... *G06F 17/289* (2013.01); *G10L 15/005* (2013.01); *G10L 15/30* (2013.01); *G10L 15/00* (2013.01)

(58) Field of Classification Search
CPC .. H04M 3/568; H04M 1/6041; H04M 1/6066; H04M 1/7255; H04M 3/4936;
(Continued)

(56) References Cited

U.S. PATENT DOCUMENTS 5,724,526 A * 3/1998 Kunita .................... G10L 15/26
                                                      704/254
9,183,199 B2 * 11/2015 Wu ....................... G06F 17/289
(Continued)

FOREIGN PATENT DOCUMENTS

JP    H8-256114 A    10/1996
JP    2003-29779 A    1/2003
(Continued)

OTHER PUBLICATIONS

International Search Report dated Jun. 28, 2016 during the prosecution of International Application No. PCT/JP2016/061672.
(Continued)

*Primary Examiner* — Akelaw Teshale
(74) *Attorney, Agent, or Firm* — Troutman Sanders LLP

(57) ABSTRACT

An interpretation distributing device includes: an interpreted voice acquiring unit that acquires at least one piece of interpreted voice data of two or more pieces of interpreted voice data which are voice data obtained by interpreting voice in a first language into voice in two or more different languages; and an interpreted voice transmitting unit that transmits at least one piece of the interpreted voice data acquired by the interpreted voice acquiring unit to one or more terminal devices.

3 Claims, 22 Drawing Sheets

(58) Field of Classification Search
CPC ............... H04M 1/05; H04M 1/72519; H04M 2203/401; H04M 2242/12; H04M 2250/02; H04M 2250/12; H04M 2250/62; H04M 3/436; H04M 3/493; H04M 3/5166; H04M 3/5175; H04M 3/51
USPC ............................ 379/202.01, 265.09, 88.01
See application file for complete search history.

(56) References Cited

U.S. PATENT DOCUMENTS

| | | | | |
|---|---|---|---|---|
| 2007/0225973 A1* | 9/2007 | Childress | ................ | G10L 25/87 704/211 |
| 2009/0187400 A1* | 7/2009 | Liu | ...................... | G06F 17/289 704/8 |
| 2010/0235161 A1* | 9/2010 | Kim | ....................... | G10L 13/00 704/3 |
| 2012/0221321 A1* | 8/2012 | Nakamura | .............. | G10L 15/32 704/2 |
| 2013/0238336 A1* | 9/2013 | Sung | ....................... | G10L 15/32 704/255 |
| 2013/0262079 A1* | 10/2013 | D'Penha | ............. | G06F 17/2836 704/3 |
| 2014/0006007 A1* | 1/2014 | Sumita | .................. | G06F 17/289 704/4 |
| 2014/0303957 A1* | 10/2014 | Lee | ....................... | G06F 17/289 704/2 |

FOREIGN PATENT DOCUMENTS

| | | |
|---|---|---|
| JP | 2005-45461 A | 2/2005 |
| JP | 2007-166391 A | 6/2007 |
| JP | 2009-15370 A | 1/2009 |
| JP | 2010-506444 A | 2/2010 |
| JP | 2012-222437 A | 11/2012 |

OTHER PUBLICATIONS

Notification of Reasons for Refusal dated Sep. 12, 2016 during the prosecution of Japanese Patent Application No. 2015-082135.

* cited by examiner

| LANGUAGE ID | INTERPRETER ID |
|---|---|
| CHINESE | T1002 |
| ENGLISH | T1001 |

FIG. 5

| LANGUAGE ID | INTERPRETER ID |
|---|---|
| CHINESE | xxx.xxx.112.011 |
| ENGLISH | xxx.xxx.112.011 |
| RUSSIAN | xxx.xxx.112.012 |
| KOREAN | xxx.xxx.112.012 |

FIG. 6

| LANGUAGE ID | TERMINAL ID |
|---|---|
| ENGLISH | xxx.xxx.155.123 |
| CHINESE | xxx.xxx.155.123 |
| ENGLISH | xxx.xxx.155.112 |
| ENGLISH | xxx.xxx.155.098 |
| ⋮ | ⋮ |

FIG. 9

| LANGUAGE ID | LANGUAGE ID |
|---|---|
| ENGLISH | xxx.xxx.112.011 |
| ENGLISH | xxx.xxx.112.012 |
| ENGLISH | xxx.xxx.112.013 |
| ENGLISH | xxx.xxx.112.014 |
| ENGLISH | xxx.xxx.112.015 |
| CHINESE | xxx.xxx.112.016 |
| CHINESE | xxx.xxx.112.017 |
| CHINESE | xxx.xxx.112.018 |
| CHINESE | xxx.xxx.112.019 |
| CHINESE | xxx.xxx.112.020 |

FIG. 17

| TERMINAL NUMBER | DEVICE ID |
|---|---|
| 81 | xxx.xxx.112.011 |
| 42 | xxx.xxx.112.012 |
| 42 | xxx.xxx.112.013 |
| 42 | xxx.xxx.112.014 |
| 42 | xxx.xxx.112.015 |
| 10 | xxx.xxx.112.016 |
| 10 | xxx.xxx.112.017 |
| 5 | xxx.xxx.112.018 |
| 4 | xxx.xxx.112.019 |
| 4 | xxx.xxx.112.020 |

FIG. 18

| MAXIMUM NUMBER | DEVICE ID |
|---|---|
| 100 | xxx.xxx.112.011 |
| 50 | xxx.xxx.112.012 |
| 50 | xxx.xxx.112.013 |
| 50 | xxx.xxx.112.014 |
| 50 | xxx.xxx.112.015 |
| 50 | xxx.xxx.112.016 |
| 50 | xxx.xxx.112.017 |
| 25 | xxx.xxx.112.018 |
| 25 | xxx.xxx.112.019 |
| 25 | xxx.xxx.112.020 |

FIG. 19

| LANGUAGE ID | DEVICE ID |
|---|---|
| ENGLISH | xxx.xxx.112.011 |
| ENGLISH | xxx.xxx.112.012 |
| ENGLISH | xxx.xxx.112.013 |
| ENGLISH | xxx.xxx.112.014 |
| ENGLISH | xxx.xxx.112.015 |
| ENGLISH | xxx.xxx.112.016 |
| ENGLISH | xxx.xxx.112.017 |
| ENGLISH | xxx.xxx.112.018 |
| CHINESE | xxx.xxx.112.019 |
| CHINESE | xxx.xxx.112.020 |

FIG. 20

INTERPRETATION DISTRIBUTING DEVICE, CONTROL DEVICE, TERMINAL DEVICE, INTERPRETATION DISTRIBUTING METHOD, CONTROL METHOD, INFORMATION PROCESSING METHOD, AND PROGRAM

CROSS-REFERENCE TO RELATED APPLICATIONS

This is a U.S. national phase application under 35 U.S.C. § 371 of International Patent Application No. PCT/JP2016/061672, filed on Apr. 11, 2016, and claims benefit of priority to Japanese Patent Application No. 2015-082135, filed Apr. 14, 2015. The entire contents of these applications are hereby incorporated by reference.

TECHNICAL FIELD

The present invention relates to a system that transmits interpreted voice data and the like.

BACKGROUND

A simultaneous interpretation system using infrared rays is known as a conventional technique (for example, see Japanese Unexamined Patent Application, First Publication No. Hei 8-256114).

Japanese Unexamined Patent Application, First Publication No. Hei 8-256114 (Page 1, FIG. 3, and the like)

SUMMARY

However, in the conventional technique, since interpreted voice data is transmitted from a transmitting device using infrared rays or the like, there is a problem in that a dedicated receiving device is required for receiving the interpreted voice data and outputting voice. Accordingly, a user has to borrow or prepare a dedicated receiver or the like in advance in order to hear the interpreted voice and there is a problem in that the interpreted voice cannot be heard when a dedicated receiver is not prepared. When interpreted voice suddenly becomes necessary or the like, there is a problem in that interpreted voice cannot be heard unless a dedicated receiver is prepared.

The present invention is made to solve the above-mentioned problems and an object of the present invention is to provide an interpretation distributing device and the like which enables outputting of interpreted voice without using a dedicated receiving device.

An interpretation distributing device according to the present invention is an interpretation distributing device including: an interpreted voice acquiring unit that acquires at least one piece of interpreted voice data of two or more pieces of interpreted voice data which are voice data obtained by interpreting voice in a first language into voice in two or more different languages; and an interpreted voice transmitting unit that transmits at least one piece of the interpreted voice data acquired by the interpreted voice acquiring unit to one or more terminal devices.

According to this configuration, it is possible to output interpreted voice without using a dedicated receiving device.

An interpretation distributing device according to the present invention is the interpretation distributing device in which the interpreted voice acquiring unit acquires two or more pieces of interpreted voice data.

According to this configuration, it is possible to transmit interpreted voice data in two or more languages.

An interpretation distributing device according to the present invention is the interpretation distributing device further including: a message receiving unit that receives a message from one or more terminal devices in response to the interpreted voice data transmitted by the interpreted voice transmitting unit; and a message output unit that outputs the message received by the message receiving unit.

According to this configuration, it is possible to output a message from a terminal device.

An interpretation distributing device according to the present invention is the interpretation distributing device further including: a terminal number acquiring unit that acquires terminal number information indicating the number of terminal devices to which the interpreted voice transmitting unit transmits the interpreted voice data; and a terminal number acquiring unit that transmits the terminal number information acquired by the terminal number acquiring unit.

According to this configuration, it is possible to notify another device of the number of terminals to which an interpretation distributing device transmits interpreted voice data.

A control device according to the present invention is a control device including: a control-side transmission request receiving unit that receives transmission request information including a language identifier which is an identifier of a language and a terminal identifier of a terminal device among two or more terminal devices; a distributing device information storage unit that stores distributing device information which is information on a plurality of interpretation distributing devices; a distribution source determining unit that determines the interpretation distributing device transmitting interpretation voice data, which is interpreted into the language indicated by the language identifier of the transmission request information received by the control-side transmission request receiving unit, as the interpretation voice data acquired by interpreting voice in a first language using the distributing device information; and a distribution processing unit that performs a process of transmitting the interpreted voice data interpreted into the language indicated by the language identifier of the transmission request information from the interpretation distributing device determined by the distribution source determining unit to the terminal device indicated by the terminal identifier of the transmission request information.

According to this configuration, it is possible to appropriately determine interpreted voice data as a transmission source of the interpreted voice data transmitted to a terminal device.

A control device according to the present invention is the control device in which the distribution source determining unit determines the interpretation distributing device transmitting the interpreted voice data to the terminal device indicated by the terminal identifier of the transmission request information, among predetermined interpretation distributing devices transmitting the interpreted voice data in the language indicated by the language identifier of the transmission request information received by the control-side transmission request receiving unit out of the plurality of interpretation distributing device, using the distributing device information.

According to this configuration, it is possible to determine an interpretation distributing device transmitting interpreted voice data among interpretation distributing devices transmitting interpreted voice data in a predetermined language.

A control device according to the present invention is the control device further including: a distribution language determining unit that determines the language of the interpreted voice data transmitted by the plurality of interpretation distributing devices using the distributing device information and stores information indicating the language of the interpreted voice data transmitted by the interpretation distributing devices in the distributing device information; and a language determination processing unit that performs a process of transmitting the interpreted voice data in the language determined by the distribution language determining unit to the plurality of interpretation distributing devices, in which the distribution source determining unit determines the interpretation distributing device transmitting the interpreted voice data to the terminal device indicated by the terminal identifier of the transmission request information among one or more interpretation distributing devices transmitting the interpreted voice data in the language indicated by the language identifier of the transmission request information received by the control-side transmission request receiving unit using the distributing device information stored by the distribution language determining unit.

According to this configuration, it is possible to appropriately assign languages of interpreted voice data to be transmitted to interpretation distributing devices.

A terminal device according to the present invention is a terminal device including: a language identifier receiving unit that receives language identifiers of languages for interpreted voice data in two or more languages transmitted by one or more interpretation distributing devices transmitting the interpreted voice data which is voice data into which voice in a first language is interpreted; a menu constructing unit that constructs a menu for designating the language of the received interpreted voice data using two or more language identifiers received by the language identifier receiving unit; a display unit that displays the menu constructed by the menu constructing unit; a language designation receiving unit that receives an operation of designating a language to be heard using the menu constructed by the menu constructing unit; an interpreted voice receiving unit that receives the interpreted voice data in the language to be heard designated by the operation received by the language designation receiving unit; and an interpreted voice output unit that outputs the interpreted voice data in the language to be heard received by the interpreted voice receiving unit.

According to this configuration, it is possible to display a menu for designating an interpreted language using the language identifiers of the languages of the interpreted voice data transmitted by the interpretation distributing devices.

A terminal device according to the present invention is the terminal device further including: a message receiving unit that receives an input of a message in response to the interpreted voice data output from the interpreted voice output unit; and a message transmitting unit that transmits the message received by the message receiving unit to the interpretation distributing device as a transmission source of the interpreted voice data output from the interpreted voice output unit.

According to this configuration, it is possible to transmit a message to an interpretation distributing device.

A terminal device according to the present invention is the terminal device further including a user identifier storage unit that stores a user identifier of a user of the terminal device, in which the message transmitting unit transmits the user identifier stored in the user identifier storage unit to the interpretation distributing device along with the message.

According to this configuration, it is possible to notify a user transmitting a message.

A terminal device according to the present invention is the terminal device further including an interpreted voice storage unit that stores the interpreted voice data, in which the interpreted voice output unit stores the interpreted voice data to be heard received by the interpreted voice receiving unit in the interpreted voice storage unit.

According to this configuration, it is possible to record interpreted voice which is heard.

A terminal device according to the present invention is the terminal device further including an interpreted voice storage unit that stores the interpreted voice data, wherein the language designation receiving unit further receives an operation of designating one or more languages to be recorded, in which the interpreted voice receiving unit further receives the interpreted voice data in the language to be recorded designated by the operation received by the language designation receiving unit, and the interpreted voice output unit stores the interpreted voice data to be recorded received by the interpreted voice receiving unit in the interpreted voice storage unit.

According to this configuration, it is possible to record interpreted voice. For example, it is possible to record interpreted voice which is not heard.

A terminal device according to the present invention is the terminal device further including a transmission request transmitting unit that transmits transmission request information for requesting transmission of the interpreted voice data in the language designated by the operation received by the language designation receiving unit to a control device that determines the interpretation distributing device transmitting the interpreted voice data requested by the transmission request information, in which the interpreted voice receiving unit receives the interpreted voice data requested by the transmission request information from the interpretation distributing device determined by the control device.

According to this configuration, it is possible to acquire voice data interpreted in a designated language via the control device.

According to the interpretation distributing device and the like of the present invention, it is possible to output interpreted voice without using a dedicated receiving device.

BRIEF DESCRIPTION OF DRAWINGS

FIG. 5 is a diagram illustrating a language identifier management table in the interpretation distributing system.

FIG. 6 is a diagram illustrating a received language identifier management table in the interpretation distributing system.

FIG. 9 is a diagram illustrating a transmission request management table in the interpretation distributing system.

FIG. 17 is a diagram illustrating a transmitted language management table in the interpretation distributing system.

FIG. 18 is a diagram illustrating a terminal number management table in the interpretation distributing system.

FIG. 19 is a diagram illustrating a maximum access number management table in the interpretation distributing system.

FIG. 20 is a diagram illustrating a transmitted language management table in the interpretation distributing system.

DETAILED DESCRIPTION

Hereinafter, an interpretation distributing device and the like according to embodiments will be described with reference to the accompanying drawings. Elements referenced by the same reference signs in the embodiments perform the same operations and thus description thereof may not be repeated.

Figure 1:
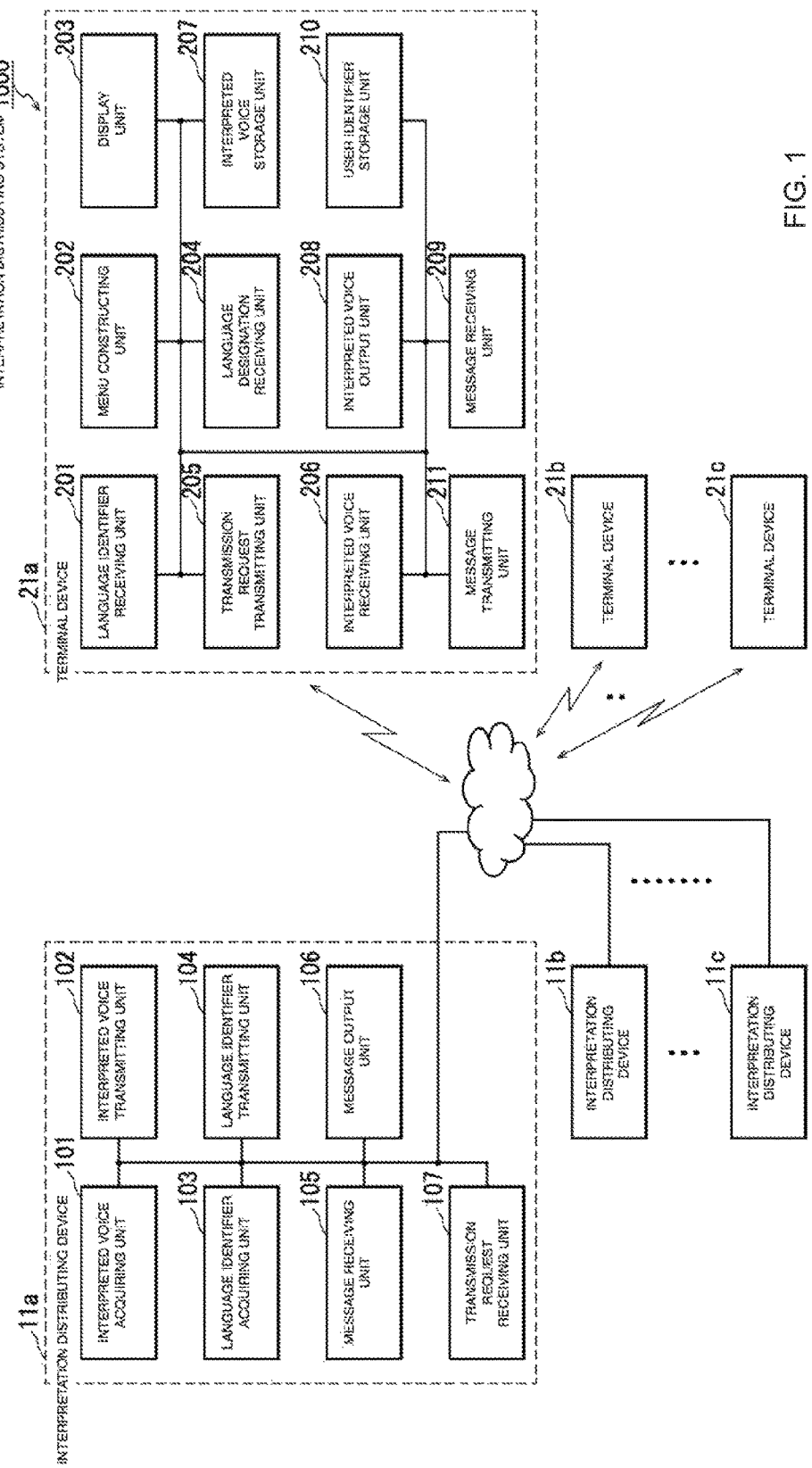
FIG. 1 is a block diagram of an interpretation distributing system according to Embodiment 1 of the present invention.

FIG. 1 is a block diagram of an interpretation distributing system 1000 according to this example.

The interpretation distributing system 1000 includes one or two or more interpretation distributing devices 11 and one or two or more terminal devices 21. In this example, the interpretation distributing system 1000 includes p (where p is an integer equal to or greater than three) interpretation distributing devices 11 and the interpretation distributing devices 11 are described as a first interpretation distributing device 11a, a second interpretation distributing device 11b, and a p-th interpretation distributing device 11c. In this example, the interpretation distributing system 1000 includes q (where q is an integer equal to or greater than three) terminal devices 21, and the terminal devices are described as a first terminal device 21a, a second terminal device 21b, and a q-th terminal device 21c. The number of interpretation distributing devices 11 in the interpretation distributing system 1000 may be one or two, and the number of terminal devices 21 in the interpretation distributing system 1000 may be one or two.

The one or two or more interpretation distributing devices 11 and the one or two or more terminal devices 21 are connected to each other to transmit and receive information via a network, a communication line, or the like in a wireless manner, in a wired manner, or in combination thereof.

Each interpretation distributing device 11 includes an interpreted voice acquiring unit 101, an interpreted voice transmitting unit 102, a language identifier acquiring unit 103, a language identifier transmitting unit 104, a message receiving unit 105, a message output unit 106, and a transmission request receiving unit 107.

Each terminal device 21 includes a language identifier receiving unit 201, a menu constructing unit 202, a display unit 203, a language designation receiving unit 204, a transmission request transmitting unit 205, an interpreted voice receiving unit 206, an interpreted voice storage unit 207, an interpreted voice output unit 208, a message receiving unit 209, a user identifier storage unit 210, and a message transmitting unit 211.

The interpretation distributing device 11 is, for example, a server device that can distribute voice data. The interpretation distributing device 11 is realized by a computer or the like.

The interpreted voice acquiring unit 101 acquires at least one of two or more pieces of interpreted voice data. Here, the two or more pieces of interpreted voice data are, for example, two or more pieces of interpreted voice data that can be transmitted from the interpretation distributing system 1000. The interpreted voice acquiring unit 101 may acquire two or more pieces of interpreted voice data. The interpreted voice data is voice data which is obtained by interpreting voice in a first language into voice in a language other than the first language. For example, the interpreted voice data is voice data of voice which is obtained by simultaneously interpreting the first language. Interpretation may be considered to be translation. Two or more pieces of interpreted voice data are pieces of voice data which are obtained by interpreting voice in the first language into two or more other languages and are pieces of voice data that are different from each other. The first language may be any language and the language into which the first language is interpreted may be any language. Here, the language is, for example, a symbolic system or the like that can be converted by interpretation, and vernaculars such as so-called dialects may also be considered languages. For example, Mandarin and Cantonese in Chinese may be considered to be different languages.

For example, when the interpretation distributing system 1000 includes only a single interpretation distributing device 11, the interpreted voice acquiring unit 101 of the interpretation distributing device 11 acquires all of the two or more pieces of interpreted voice data which are distributed by the interpretation distributing system 1000. When the interpretation distributing system 1000 includes a plurality of interpretation distributing devices 11, the interpreted voice acquiring units 101 of the plurality of interpretation distributing devices 11 may partially acquire two or more pieces of interpreted voice data which are distributed by the interpretation distributing devices 11. For example, the interpreted voice data may be partially acquired for each language. When the interpretation distributing system includes a plurality of interpretation distributing devices 11, the interpreted voice acquiring unit 101 of one interpretation distributing device 11 may acquire two or more pieces of interpreted voice data or may acquire only one piece of interpreted voice data. The one or more pieces of interpreted voice data which are received by each of the plurality of interpretation distributing devices 11 may partially overlap. For example, the interpreted voice acquiring units 101 of the plurality of interpretation distributing devices 11 may repeatedly acquire the interpreted voice data in one language. When the interpretation distributing system 1000 includes a plurality of interpretation distributing devices 11 and the interpretation distributing system 1000 receives two or more pieces of interpreted voice data which are interpreted in two or more languages, the interpretation distributing devices 11 may acquire different pieces of interpreted voice data one by one.

The interpreted voice data is, for example, data of voice which is obtained by allowing an interpreter to interpret voice in a first language into a language other than the first language. The interpreted voice data is generally data of voice which is obtained by allowing an interpreter to interpret voice in the first language, but the interpreted voice data may be data of voice which is obtained by automatically translating the voice in the first language.

The interpreted voice acquiring unit 101 receives interpreted voice via a voice input device such as a microphone and acquires interpreted voice data using the voice signal acquired by the voice input device. For example, the interpreted voice acquiring unit 101 samples the voice signal of the interpreted voice which is received via an input device that is not illustrated and acquires interpreted voice data. The interpreted voice acquiring unit 101 may acquire interpreted voice data by receiving or accepting interpreted voice data transmitted or output from another information processing terminal that is not illustrated. For example, an information processing terminal (for example, a portable information terminal, a multifunctional portable terminal, a tablet terminal, a computer such as a notebook computer) that is not illustrated and that is used by an interpreter receives interpreted voice from the interpreter via a voice input device or the like. Then, the information processing terminal samples the voice signal indicating the received voice and acquires interpreted voice data. The interpreted voice acquiring unit 101 may acquire the interpreted voice data by receiving or accepting the interpreted voice data transmitted or output from the information processing terminal. In this case, the interpreted voice acquiring unit 101 may include communication means that is not illustrated, or a receiving unit (not illustrated) or the like of the interpretation distributing device 11 may acquire the received interpreted voice data. The interpreted voice acquiring units 101 of a plurality of interpretation distributing devices 11 may acquire interpreted voice data which is obtained by interpreting voice in a first language into another single language.

It is preferable that the interpreted voice acquiring unit 101 acquire interpreted voice data to specify a language identifier which is an identifier of a language of the interpreted voice data. The language identifier is a language name such as Japanese or English or a code assigned to a language such as en or jp.

For example, the interpreted voice acquiring unit 101 may acquire interpreted voice data correlated with a language identifier. For example, the interpreted voice acquiring unit 101 may acquire a language identifier corresponding to information for designating a language, which is selected and input by an interpreter in inputting interpreted voice to an input device, another information processing device, or the like, along with the interpreted voice data. In this case, the language identifier correlated with the interpreted voice data can be acquired as a language identifier of the interpreted voice data. The language identifier correlated with the interpreted voice data may be stored in a header of the interpreted voice data.

The interpreted voice acquiring unit 101 may acquire interpreted voice data correlated with an interpreter identifier and the language identifier acquiring unit 103 to be described later may acquire a language identifier correlated with the interpreter identifier. In this case, an interpreter identifier matching the interpreter identifier correlated with one piece of interpreted voice data acquired by the interpreted voice acquiring unit 101 may be detected from the interpreter identifier acquired by the language identifier acquiring unit 103, and a language identifier correlated with the interpreter identifier may be acquired as the language identifier of the interpreted voice data acquired by the interpreted voice acquiring unit 101. The interpreter identifier is an identifier of an interpreter and examples thereof include an interpreter name, a code assigned to the interpreter, a mail address of the interpreter, a code such as a serial number assigned to an information processing terminal used by the interpreter, and address information such as an IP address. An identifier assigned to interpreted voice data may be used instead of the interpreter identifier. The same is true in the following description.

When one interpretation distributing device 11 acquires only interpreted voice data in one language, the language identifier which is acquired by the language identifier acquiring unit 103 to be described later may be acquired as the language identifier of the interpreted voice data acquired by the interpreted voice acquiring unit 101. The language of one or more pieces of interpreted voice data which can be transmitted by one interpretation distributing device 11, that is, one or more languages of the interpreted voice data acquired by the interpreted voice acquiring unit 101, may be determined in advance. In this case, the language identifier acquiring unit 103 may read and acquire the language identifiers of one or more predetermined languages stored in advance in a storage unit that is not illustrated, that is, the languages of one or more pieces of interpreted voice data which can be transmitted by one interpretation distributing device 11.

The interpreted voice transmitting unit 102 transmits at least one piece of the interpreted voice data acquired by the interpreted voice acquiring unit 101 to one or more terminal devices 21. In general, the interpreted voice data is transmitted in a pull type. For example, the interpreted voice transmitting unit 102 may transmit only a part or all of the interpreted voice data acquired by the interpreted voice acquiring unit 101 to one or more terminal devices 21.

For example, the interpreted voice transmitting unit 102 may transmit at least one piece of the interpreted voice data acquired by the interpreted voice acquiring unit 101 in a broadcast manner. When the interpreted voice data is transmitted in a broadcast manner, the interpreted voice transmitting unit 102 transmits the interpreted voice data to be transmitted in correlation with the language identifier correlated with the interpreted voice data, for example, such that the terminal device 21 receiving the interpreted voice data can identify the language of the received interpreted voice data. For example, the language identifier is transmitted in a state in which the language identifier is added to a header of a packet of the interpreted voice data.

When the interpreted voice data is transmitted in a broadcast manner, for example, it is preferable that the interpreted voice transmitting unit 102 transmit all the interpreted voice data acquired by the interpreted voice acquiring unit 101.

For example, the interpreted voice transmitting unit 102 may transmit at least one piece of the interpreted voice data acquired by the interpreted voice acquiring unit 101 to one or more specific terminal devices 21 in a multicast or unicast manner. For example, the interpreted voice data in the language indicated by the language identifier of transmission request information received by the transmission request transmitting unit 107 is transmitted to a terminal device 21 indicated by a terminal identifier of the transmission request information or a group of terminal devices 21 including the terminal device 21. When one interpretation distributing device 11 acquires and outputs only interpreted voice data in one language, the interpreted voice transmitting unit 102 may transmit the interpreted voice data acquired by the interpreted voice acquiring unit 101 to a terminal device 21 indicated by a terminal identifier of the transmission request information received by the transmission request transmitting unit 107 or a group of terminal devices 21 including the terminal device 2. The terminal identifier is information capable of identifying a terminal device 21 and is address information of the terminal device 21 such as an IP address. The interpreted voice data in the language indicated by the language identifier of the transmission request information received by the transmission request transmitting unit 107 is interpreted voice data correlated with the same language identifier as the language identifier of the transmission request information or interpreted voice data correlated with the language identifier indicating the same language as the language indicated by the language identifier among the interpreted voice data acquired by the interpreted voice acquiring unit 101.

For example, when the interpreted voice data is transmitted in a multicast or unicast manner and the transmission request transmitting unit 107 receives transmission request information having two or more different language identifiers correlated with one terminal identifier, the interpreted voice transmitting unit 102 transmits interpreted voice data in two or more languages indicated by the two or more language identifiers to the terminal device 21 indicated by the terminal identifier of the transmission request information. Details of the transmission request information will be described later.

It is preferable that the interpreted voice transmitting unit 102 transmit the interpreted voice data in a streaming manner. Particularly, when simultaneous interpretation or the like is carried out, it is preferable that streaming transmission be used to suppress a delay of output of interpreted voice as much as possible. The interpreted voice data may be transmitted in another manner such as a progressive download manner.

The interpreted voice transmitting unit 102 may simultaneously transmit a plurality of pieces of interpreted voice data of different transmission rates as the interpreted voice data in one language. For example, interpreted voice data of 2.4 kbps and interpreted voice data of 32 kbps may be simultaneously transmitted as the interpreted voice data in one language. The interpreted voice transmitting unit 102 may simultaneously transmit a plurality of pieces of interpreted voice data which are converted using different codecs as the interpreted voice data in one language.

The interpreted voice transmitting unit 102 is generally realized by wireless or wired communication means, but may be realized by broadcast means. The interpreted voice transmitting unit 102 may be considered to include a communication device or may be considered not to include a communication device.

In the following embodiment, it is assumed that the interpreted voice transmitting unit 102 transmits interpreted voice data in a unicast manner.

The language identifier acquiring unit 103 acquires language identifiers of one or more pieces of interpreted voice data acquired by the interpreted voice acquiring unit 101. The language identifiers may be considered to be language identifiers of the interpreted voice data which can be transmitted by the interpreted voice transmitting unit 102. For example, the language identifier acquiring unit 103 acquires a language identifier correlated with an interpreter identifier. The language identifier correlated with the interpreter identifier is, for example, a language identifier of a language of the interpreted voice data input by an interpreter indicated by the interpreter identifier.

The language identifier acquiring unit 103 may acquire a language identifier (or a language identifier correlated with the interpreter identifier) input via an input device such as a keyboard or a touch panel (not illustrated). A language identifier (or a language identifier correlated with the interpreter identifier) transmitted from an information processing terminal (not illustrated) such as a portable information terminal which is used by the interpreter may be received. In this case, the language identifier acquiring unit 103 may include communication means that is not illustrated or may acquire the interpreted voice data received by a receiver or the like (not illustrated) of the interpretation distributing device 11. The language identifier correlated with the interpreter identifier may be considered to be, for example, a set of an interpreter identifier and a language identifier. The language identifier acquiring unit 103 may acquire the language identifier from the interpreted voice data correlated with the language identifier received by the interpreted voice acquiring unit 101.

The language identifier acquiring unit 103 may store the acquired language identifier in a storage unit or the like that is not illustrated.

When the language identifiers of one or more pieces of interpreted voice data which can be transmitted by the interpreted voice transmitting unit 102 are stored in advance in a storage unit or the like that is not illustrated, the acquisition of the language identifier by the language identifier acquiring unit 103 may be performed by reading the stored language identifier.

The language identifier transmitting unit 104 transmits the language identifier acquired by the language identifier acquiring unit 103. The language identifier transmitting unit 104 transmits, for example, the language identifier acquired by the language identifier acquiring unit 103 in correlation with its own device identifier. Examples of the device identifier include address information such as an IP address or a URI of the interpretation distributing device 11. For example, the language identifier transmitting unit 104 transmits one or more language identifiers acquired by the language identifier acquiring unit 103 in a broadcast manner. In this case, the timing at which the language identifier transmitting unit 104 transmits the language identifier in a broadcast manner does not matter. For example, the language identifier may be repeatedly transmitted at a predetermined periodic timing or at an unspecified timing. When a receiving unit (not illustrated) of the interpretation distributing device 11 receives a request for transmission of a language identifier from one or more terminal devices 21, the language identifier transmitting unit 104 may transmit the language identifier to the terminal device 21 in a multicast or unicast manner. Alternatively, the language identifier may be transmitted to one or more predetermined terminal devices 21 in a multicast or unicast manner. In this case, the timing at which the language identifier transmitting unit 104 transmits the language identifier in a broadcast manner does not matter.

The language identifier transmitting unit 104 is generally realized by wireless or wired communication means, but may be realized by broadcast means. The language identifier transmitting unit 104 may be considered to include a communication device or may be considered not to include a communication device.

The message receiving unit 105 receives a message from one or more terminal devices 21 in response to the interpreted voice data transmitted from the interpreted voice transmitting unit 102. The message received by the message receiving unit 105 is a message from a user of the terminal device 21 associated with the interpreted voice data transmitted by the interpretation distributing device 11. The message is constituted, for example, by text, an image, or a combination of text and an image. For example, the message is a message associated with quality of the transmitted interpreted voice data. For example, the message is information (information such as a high speaking speed or a low speaking speed) indicating a demand for a speaking speed of the interpreted voice data. The message may be information (such as information pointing out an error in translation or information requesting checking of translation) such as complaints about details of the interpreted voice data. For example, when the interpreted voice transmitting unit 102 transmits the interpreted voice data, the message receiving unit 105 receives a message transmitted using address information such as an IP address of the interpretation distributing device 11 as a transmission source added to the interpreted voice data as a destination. The message receiving unit 105 may receive a message correlated with the language identifier correlated with the interpreted voice data transmitted by the interpreted voice transmitting unit 102. Particularly, when one interpretation distributing device 11 transmits interpreted voice data in two or more languages, it is preferable that a message correlated with the language identifiers be received. The message correlated with a language identifier may be considered to be a message having the language identifier.

The message receiving unit 105 is generally realized by wireless or wired communication means. The message receiving unit 105 may be considered to include a communication device or may be considered not to include a communication device.

The message output unit 106 outputs the message received by the message receiving unit 105. Here, outputting of a message is display of the message on a monitor or the like that is not illustrated or transmission of the message to an information processing terminal (not illustrated) which is used by the interpreter. The message may be stored in a storage unit that is not illustrated.

For example, when the message received by the message receiving unit 105 is correlated with a language identifier, the message output unit 106 may output (for example, display) the language identifier along with the message. When the message received by the message receiving unit 105 is transmitted to the information processing terminal used by the interpreter, the message may be transmitted to the information processing terminal of the interpreter corresponding to the interpreter identifier correlated with the language identifier. For example, when the interpreter identifier is address information of the information processing terminal of the interpreter, a mail address of the interpreter, or an account of a short messaging service (SMS) or the like, the message received by the message receiving unit 105 may be transmitted using the interpreter identifier as a destination or the like.

The message output unit 106 may be considered to include an output device such as a monitor or communication means or may not be considered to include an output device such as a monitor or communication means. The message output unit 106 can be realized by driver software of the output device, by the output device and driver software of the output device, or the like.

The transmission request receiving unit 107 receives transmission request information from a terminal device 21. The transmission request information is information for requesting transmission of interpreted voice data which is transmitted from the terminal device 21. The transmission request information is, for example, information including a terminal identifier of the terminal device 21 and a language identifier. When one interpretation distributing device transmits only interpreted voice data in one language as the interpreted voice data, the transmission request information may not include a language identifier.

The transmission request receiving unit 107 is generally realized by wireless or wired communication means. The transmission request receiving unit 107 may be considered to include a communication device or may be considered not to include a communication device.

A terminal device 21 is, for example, a general-purpose terminal device. For example, it is preferable that the terminal device 21 be a general-purpose terminal device which can execute application software. For example, the terminal device 21 is an information processing terminal. For example, the terminal device is a portable information terminal which is an information terminal capable of being carried by a user. Examples of the portable information terminal include a portable information terminal, a mobile phone, a multifunctional mobile phone such as a so-called smartphone, a tablet terminal, and a notebook computer. The terminal device 21 be a device capable of performing wireless communication using Wi-Fi (registered trademark), Bluetooth (registered trademark), or the like.

The language identifier receiving unit 201 receives language identifiers of languages for two or more pieces of interpreted voice data transmitted by one or more interpretation distributing devices 11 transmitting interpreted voice data which is voice data obtained by interpreting voice in a first language. For example, the language identifier receiving unit 201 may receive two or more language identifiers corresponding to the interpreted voice data in two or more languages transmitted by a single interpretation distributing device 11 or may receive the language identifiers corresponding to the interpreted voice data corresponding to the one or more pieces of interpreted voice data transmitted by the plurality of interpretation distributing devices 11. The language identifier receiving unit 201 receives the language identifier correlated with the device identifier of the interpretation distributing device 11 transmitting the language identifier. For example, the language identifier received by the language identifier receiving unit 201 is a language identifier transmitted by the language identifier transmitting unit 104 of the interpretation distributing device 11. The language identifier receiving unit 201 stores the received language identifier in a storage unit that is not illustrated in correlation with the device identifier correlated with the language identifier.

When the menu constructing unit 202 to be described later constructs a menu, a transmitting unit or the like that is not illustrated may transmit (for example, transmit in a broadcast manner) information for requesting transmission of a language identifier of interpreted voice data to one or more interpretation distributing devices 11 and may receive the interpreted voice data transmitted from the one or more interpretation distributing devices 11 in response to the request.

The language identifier receiving unit 201 is generally realized by wireless or wired communication means, but may be realized by broadcast receiving means. The language identifier receiving unit 201 may be considered to include a communication device or may be considered not to include a communication device.

The menu constructing unit 202 constructs a menu for designating a language of the received interpreted voice data using two or more language identifiers received by the language identifier receiving unit 201. The menu constructing unit 202 constructs, for example, a menu including two or more menu items indicating languages corresponding to the received two or more language identifiers. The menu items indicating the languages corresponding to the language identifiers and constructed by the menu constructing unit 202 include, for example, items in which at least a part of the language identifiers, character strings indicating the languages indicated by the language identifiers, or images, symbols, or the like indicating the languages are arranged. The menu items may be dynamically prepared using a template or the like depending on the language identifiers or may be acquired from displaying data for the menu items, which are stored in a storage unit or the like (not illustrated) in correlation with the language identifiers, by search or the like depending on the language identifiers. The menu may be constructed by dynamically arranging the menu items or the like using a template or the like. Each menu item may be correlated with a script, a command, or the like for receiving designation of the language identifier correlated with the menu item. The menu constructed by the menu constructing unit 202 may be, for example, a list-like menu in which two or more language identifiers received by the language identifier receiving unit 201 or information such as character strings or images indicating the languages indicated by the two or more language identifiers are arranged. In this case, items in the list may be considered to be the above-mentioned menu items. A technique or the like of constructing a menu for selecting one piece of information among a plurality of selectable pieces of information is known and thus detailed description thereof will not be made herein.

For example, the menu items indicating the languages in the menu constructed by the menu constructing unit 202 may be correlated with the language identifiers indicating the languages or may be correlated with the device identifiers of the interpretation distributing devices 11 having transmitted the language identifiers indicating the languages. The menu items may be correlated with the device identifiers and the language identifiers.

The menu constructed by the menu constructing unit 202 may be a menu for designating a language of interpreted voice data to be heard, may be a menu for designating a language of interpreted voice data to be recorded, or may be a menu for designating one or more languages of the interpreted voice data to be heard and one or more languages of the interpreted voice data to be recorded. The data to be heard or the data to be recorded will be described later.

The display unit 203 displays the menu constructed by the menu constructing unit 202. For example, the display unit 203 displays the menu on a monitor that is not illustrated. The timing or the trigger upon which the display unit 203 displays the menu does not matter. For example, the menu may be displayed in response to an instruction of a user received via a receiving unit or the like that is not illustrated. In this case, when the instruction is received, the language identifier receiving unit 201 may receive the language identifier. The menu may be displayed at the time at which a terminal device 21 is started. The time at which the terminal device 21 is started may be considered to be a time at which a program is started when the terminal device 21 is realized by executing the program. The display unit 203 may display an image in addition to the menu. For example, the display unit 203 may display a message input screen, a screen for selecting whether to record, or the like. The display unit 203 may be considered to include an output device such as a monitor or may not be considered to include an output device such as a monitor. The display unit 203 can be realized by driver software of a display device, by the display device and driver software of the display device, or the like.

The language designation receiving unit 204 receives an operation of designating one or more languages to be heard using the menu constructed by the menu constructing unit 202. The language to be heard is, for example, a language of interpreted voice data which should be converted into sound waves of audible sound or the like and output by the interpreted voice output unit 208 to be described later using a speaker, an earphone, or the like that is not illustrated. For example, the conversion into sound waves is conversion which is performed immediately after the interpreted voice receiving unit 206 to be described later receives interpreted voice data. The operation of designating a language using the menu is not particularly limited as long as a language can be designated using the menu. For example, the operation is an operation of designating one or more of a plurality of menu items or a plurality of list items indicating languages in the menu. For example, the operation is an operation of clicking one or more menu items or list items using a mouse or the like or tapping one or more menu items or list items using a touch panel or the like. The operation may be an operation of inputting numbers or the like correlated with the menu items correlated with the languages from a keyboard, a screen keyboard, or the like. The menu used herein may be a menu for receiving designation of a language to be heard or may be a menu for designating one or more languages of interpreted voice data to be heard and one or more languages of interpreted voice data to be recorded.

The number of languages which are designated by the language designation receiving unit 204 through the operation of designating a language to be heard is generally one but may be two or more.

The language designation receiving unit 204 may further receive an operation of designating one or two or more languages to be recorded using the menu constructed by the menu constructing unit 202. The language to be recorded is, for example, a language of interpreted voice data to be recorded by the interpreted voice output unit 208 to be described later. The recording of interpreted voice data mentioned herein may include storing the received interpreted voice data in the interpreted voice storage unit 207 to be described later or may include storing voice data acquired by sampling or the like of voice converted using the received interpreted voice data in the interpreted voice storage unit 207 to be described later. The operation of designating a language using the menu is the same as the operation of designating a language to be heard and detailed description thereof will not be made herein. The menu used herein may be a menu for receiving designation of a language to be recorded or may be a menu for designating one or more languages of interpreted voice data to be heard and one or more languages of interpreted voice data to be recorded.

It is preferable that the language which is designated by the language designation receiving unit 204 through the operation of designating a language to be recorded be different from the language designated as a language to be heard.

The transmission request transmitting unit 205 transmits transmission request information which is information for requesting transmission of interpreted voice data in the language designated by the operation of designating a language, which is received by the language designation receiving unit 204, for example, to the interpretation distributing device 11 transmitting the interpreted voice data in the language.

For example, the transmission request transmitting unit 205 acquires a language identifier indicating the language designated by the operation of designating a language, which is received by the language designation receiving unit 204, and a device identifier correlated with the language identifier and transmits transmission request information including the acquired language identifier and the terminal identifier of the terminal device 21 as a host device to the interpretation distributing device 11 indicated by the device identifier. The language identifier indicating the language designated by the operation of designating a language may be, for example, a language identifier correlated with the menu item designated by the operation of designating a language. The device identifier correlated with the language identifier is a device identifier correlated with the language identifier of the language designated by the operation of designating a language among two or more language identifiers correlated with the device identifier received by the language identifier receiving unit 201. Alternatively, the device identifier may be a device identifier correlated with the menu item designated by the operation of designating a language. The terminal identifier is address information such as an IP address of the terminal device 21, a code assigned to the terminal device 21, or the like. When interpreted voice data transmitted by one interpretation distributing device 11 is only interpreted voice data in only one language, the transmission request information may not include a language identifier. The transmission request information may include information indicating transmission of interpreted voice data or the like or may not include information indicating transmission of interpreted voice data or the like.

When the interpretation distributing device 11 transmits interpreted voice data in a broadcast manner, the transmission request transmitting unit 205 may be omitted.

The interpreted voice receiving unit 206 receives one or more pieces of interpreted voice data among two or more pieces of interpreted voice data which are voice data obtained by interpreting voice in a first language into two or more different languages as the voice data which is transmitted by one or more interpretation distributing devices 11. For example, the interpreted voice receiving unit 206 may receive interpreted voice data in two or more languages from one interpretation distributing device 11 or may receive one or more pieces of interpreted voice data from two or more interpretation distributing devices 11. In general, the interpreted voice receiving unit 206 receives interpreted voice data in a pull type.

For example, the interpreted voice receiving unit 206 receives interpreted voice data in one or two or more languages corresponding to the operation of designating a language, which is received by the language designation receiving unit 204 to be described later. For example, the interpreted voice receiving unit 206 receives interpreted voice data in the language corresponding to the operation of designating a language to be heard, which is received by the language designation receiving unit 204 to be described later. For example, the interpreted voice receiving unit 206 receives interpreted voice data in one or two or more languages corresponding to the operation of designating a language to be recorded, which is received by the language designation receiving unit 204 to be described later.

For example, when the language designation receiving unit 204 receives an operation of designating a language to be heard, the transmission request transmitting unit 205 transmits transmission request information for requesting transmission of interpreted voice data in the language to the interpretation distributing device 11 having transmitted the language identifier of the language designated by the operation. For example, when the language designation receiving unit 204 receives an operation of designating a language to be heard, the transmission request transmitting unit 205 transmits transmission request information (specifically, transmission request information including the language identifier) for requesting transmission of interpreted voice data correlated with the language identifier of the language designated by the operation to one or more interpretation distributing devices 11 having transmitted the language identifier. The interpreted voice receiving unit 206 may receive the interpreted voice data in the language requested by the transmission request information and transmitted in a unicast or multicast manner in response to the transmission request information by the interpretation distributing device 11 receiving the transmission request information, for example, the interpreted voice data correlated with the language identifier of the transmission request information. When one interpretation distributing device 11 transmits only the interpreted voice data in only one language, the transmission request transmitting unit 205 may transmit transmission request information not including the information for designating a language to be transmitted.

When interpreted voice data is transmitted from the interpretation distributing device 11 in a broadcast manner, the interpreted voice receiving unit 206 may determine whether the interpreted voice data received from the interpretation distributing device 11 is interpreted voice data in the language designated by the operation of designating a language to be seen and heard, which is received by the language designation receiving unit 204, receives the interpreted voice data in the language to be seen and heard, and may not receive the other interpreted voice data. Alternatively, the interpreted voice data may be deleted after being received. In this case, for example, the interpreted voice data is considered not to be received. The determination of whether the interpreted voice data received by the interpreted voice receiving unit 206 is interpreted voice data in the language designated by the operation of designating a language to be seen and heard, which is received by the language designation receiving unit 204, is performed depending on whether the language identifier correlated with the interpreted voice data matches the language identifier acquired by the operation of designating a language to be seen and heard. For example, it is determined that the interpreted voice data is interpreted voice data in the language designated by the operation of designating a language to be seen and heard when both language identifiers match each other, and it is determined that the interpreted voice data is not interpreted voice data in the language designated by the operation of designating a language to be seen and heard when both language identifiers does not match each other.

For example, when interpreted voice data is transmitted from an interpretation distributing device 11 in a broadcast manner, the interpreted voice receiving unit 206 may determine whether the received interpreted voice data is interpreted voice data correlated with the language identifier of the language to be heard which is designated by the operation of designating a language, may receive the interpreted voice data correlated with the language identifier of the language to be heard, and may not receive the other interpreted voice data.

When the language designation receiving unit 204 receives the operation of designating a language to be recorded, the process of receiving interpreted voice data, which is performed by the interpreted voice receiving unit 206, is the same as the above-mentioned process except that the language designated by the operation of designating a language is a language to be heard or a language to be recorded, and thus detailed description thereof will not be made.

The interpreted voice receiving unit 206 is generally realized by wireless or wired communication means. The interpreted voice receiving unit 206 may be considered to include a communication device or may be considered not to include a communication device.

One or two or more pieces of interpreted voice data are stored in the interpreted voice storage unit 207. For example, one or two or more pieces of interpreted voice data are stored in the interpreted voice storage unit 207 in correlation with language identifiers. The interpreted voice data stored in the interpreted voice storage unit 207 is, for example, interpreted voice data received by the interpreted voice receiving unit 206. Voice data which is acquired by sampling or the like of voice which is temporarily converted using the interpreted voice data received by the interpreted voice receiving unit 206 may be stored as interpreted voice data in the interpreted voice storage unit 207.

The interpreted voice storage unit 207 can be suitably embodied by a nonvolatile recording medium, but may be embodied by a volatile recording medium. The same is true of the following other storage units.

The interpreted voice output unit 208 outputs one or more pieces of interpreted voice data received by the interpreted voice receiving unit 206. The interpreted voice output unit 208 outputs, for example, one or more pieces of interpreted voice data in one or more languages to be heard, which is received by the interpreted voice receiving unit 206. For example, the interpreted voice output unit 208 outputs interpreted voice which is obtained by converting the interpreted voice data in the language to be heard received by the interpreted voice receiving unit 206 into voice.

The interpreted voice output unit 208 may store, for example, one or more pieces of interpreted voice data in one or more languages to be recorded, which is received by the interpreted voice receiving unit 206, in the interpreted voice storage unit 207. The interpreted voice output unit 208 may store voice data, which is obtained by sampling or the like of the interpreted voice obtained by converting the interpreted voice data in the language to be heard received by the interpreted voice receiving unit 206 into voice, as the interpreted voice data in the interpreted voice storage unit 207. In this way, the operation of temporarily converting the interpreted voice data received by the interpreted voice receiving unit 206 into voice, then converting the voice into voice data again, and storing the voice data may be considered to be the operation of storing the interpreted voice data received by the interpreted voice receiving unit 206 in the interpreted voice storage unit 207. When the interpreted voice data is stored, it is preferable that the interpreted voice data be stored in correlation with the corresponding language identifier.

The interpreted voice output unit 208 may store the interpreted voice data to be heard received by the interpreted voice receiving unit 206 in the interpreted voice storage unit 207 similarly to the interpreted voice data to be recorded.

Here, the output includes outputting voice from a voice output device such as a speaker, an earphone, or a headphone. The output also includes storing the interpreted voice data in the interpreted voice storage unit 207. The interpreted voice output unit 208 may be considered to include an output device such as a speaker, an earphone, and a headphone or may be considered not to include the output device. The interpreted voice output unit 208 can be embodied by driver software of the output device, the output device and the driver software of the output device, or the like.

The message receiving unit 209 receives an input of a message in response to the interpreted voice data output from the interpreted voice output unit 208. Specifically, the message receiving unit 209 receives an input of a message in response to the interpreted voice data output from the interpreted voice output unit 208 for hearing. The message is the same as described above and detailed description thereof will not be made herein.

Means for inputting a message is not particularly limited and may be a touch panel, a keyboard, a mouse, or a menu screen. For example, the message receiving unit 209 may receive a message via a so-called screen keyboard embodied by a touch panel or the like. A message may be received by voice input. The message receiving unit 209 may be embodied by a device driver of input means such as a touch panel or a keyboard, control software of a menu screen, or the like.

A user identifier of a user of a terminal device 21 is stored in the user identifier storage unit 210. Examples of the user identifier include a name of a user, an account of a user, and a mail address of a user. The user identifier may be a terminal identifier of the terminal device 21 used by the user.

The message transmitting unit 211 transmits the message received by the message receiving unit 209 to the interpretation distributing device 11 as a transmission source of the interpreted voice data output from the interpreted voice output unit 208. The message transmitting unit 211 may transmit the user identifier stored in the user identifier storage unit 210 to the interpretation distributing device 11 along with the message. By transmitting the user identifier in this way, for example, reception of a message transmitted from a user having transmitted an improper message can be refused. When one interpretation distributing device 11 transmits interpreted voice data in two or more languages, the message may be transmitted to the interpretation distributing device 11 as a transmission source in correlation with the language identifier of the interpreted voice data output from the interpreted voice output unit 208.

The message transmitting unit 211 is generally realized by wireless or wired communication means. The message transmitting unit 211 may be considered to include a communication device or may be considered not to include a communication device.

An example of an operation of an interpretation distributing device 11 in the interpretation distributing system 1000 will be described below with reference to the flowchart illustrated in FIG. 2. Here, it is assumed that one interpretation distributing device 11 acquires interpreted voice data in two or more different languages.

(Step S101) It is determined whether the language identifier acquiring unit 103 acquires a language identifier. For example, the language identifier acquiring unit 103 acquires a language identifier correlated with an interpreter identifier. The process flow moves to step S102 when a language identifier is acquired, and the process flow moves to step S103 when the language identifier is not acquired.

(Step S102) The language identifier acquiring unit 103 stores the language identifier acquired in step S101 in a storage unit or the like that is not illustrated. For example, the language identifier acquiring unit 103 stores the language identifier correlated with the acquired interpreter identifier in a storage unit or the like (not illustrated) in correlation with the interpreter identifier.

(Step S103) The language identifier transmitting unit 104 determines whether it is time to transmit one or more language identifiers acquired by the language identifier acquiring unit 103. For example, it is determined that it is time to transmit the language identifier whenever a predetermined time passes. The process flow moves to step S103 when it is time to transmit the language identifier, and the process flow moves to step S105 when it is not time to transmit the language identifier.

(Step S104) The language identifier transmitting unit 104 transmits the language identifier. For example, the language identifier is transmitted in a broadcast manner.

(Step S105) It is determined whether the transmission request receiving unit 107 acquires transmission request information. The process flow moves to step S106 when the transmission request information is received, and the process flow moves to step S107 when the transmission request information is not received.

(Step S106) The transmission request receiving unit 107 stores the transmission request information received in step S105 in a storage unit that is not illustrated.

(Step S107) It is determined whether the message receiving unit 105 receives a message. For example, the message receiving unit 105 receives a message correlated with a language identifier. The process flow moves to step S108 when the message is received, and the process flow moves to step S109 when the message is not received.

(Step S108) The message output unit 106 outputs the message received in step S107. For example, the message output unit 106 transmits the message received in step S107 to an information processing terminal (not illustrated) of the interpreter indicated by the interpreter identifier corresponding to the language identifier correlated with the message.

(Step S109) It is determined whether the interpreted voice acquiring unit 101 acquires interpreted voice data. For example, it is determined whether interpreted voice data is acquired from an information processing terminal (not illustrated) of an interpreter. For example, the interpreted voice acquiring unit 101 acquires the interpreted voice data correlated with the interpreter identifier. The process flow moves to step S110 when the interpreted voice data is acquired by the interpreted voice acquiring unit 101, and the process flow returns to step S101 when the interpreted voice data is not acquired.

(Step S110) The interpreted voice transmitting unit 102 acquires the language identifier corresponding to the interpreted voice data acquired in step S109. For example, when the interpreted voice data correlated with the interpreter identifier is acquired in step S109, the language identifier correlated with the interpreter identifier is acquired using the language identifier correlated with the interpreter identifier and stored in step S102.

(Step S111) The interpreted voice transmitting unit 102 acquires information indicating a transmission destination using the language identifier acquired in step S110. The information indicating the transmission destination is, for example, information indicating a terminal device 21 serving as a transmission destination. For example, the interpreted voice transmitting unit 102 retrieves one or more pieces of transmission request information including the language identifier acquired in step S110 from the transmission request information stored in step S106, and acquires the terminal identifiers included in the detected transmission request information as the information indicating the terminal device 21 as the transmission destination.

(Step S112) The interpreted voice transmitting unit 102 transmits the interpreted voice data received in step S109 to the transmission destination, that is, the terminal device 21, indicated by the information indicating the transmission destination acquired in step S111. Then, the process flow returns to step S101.

Figure 2:
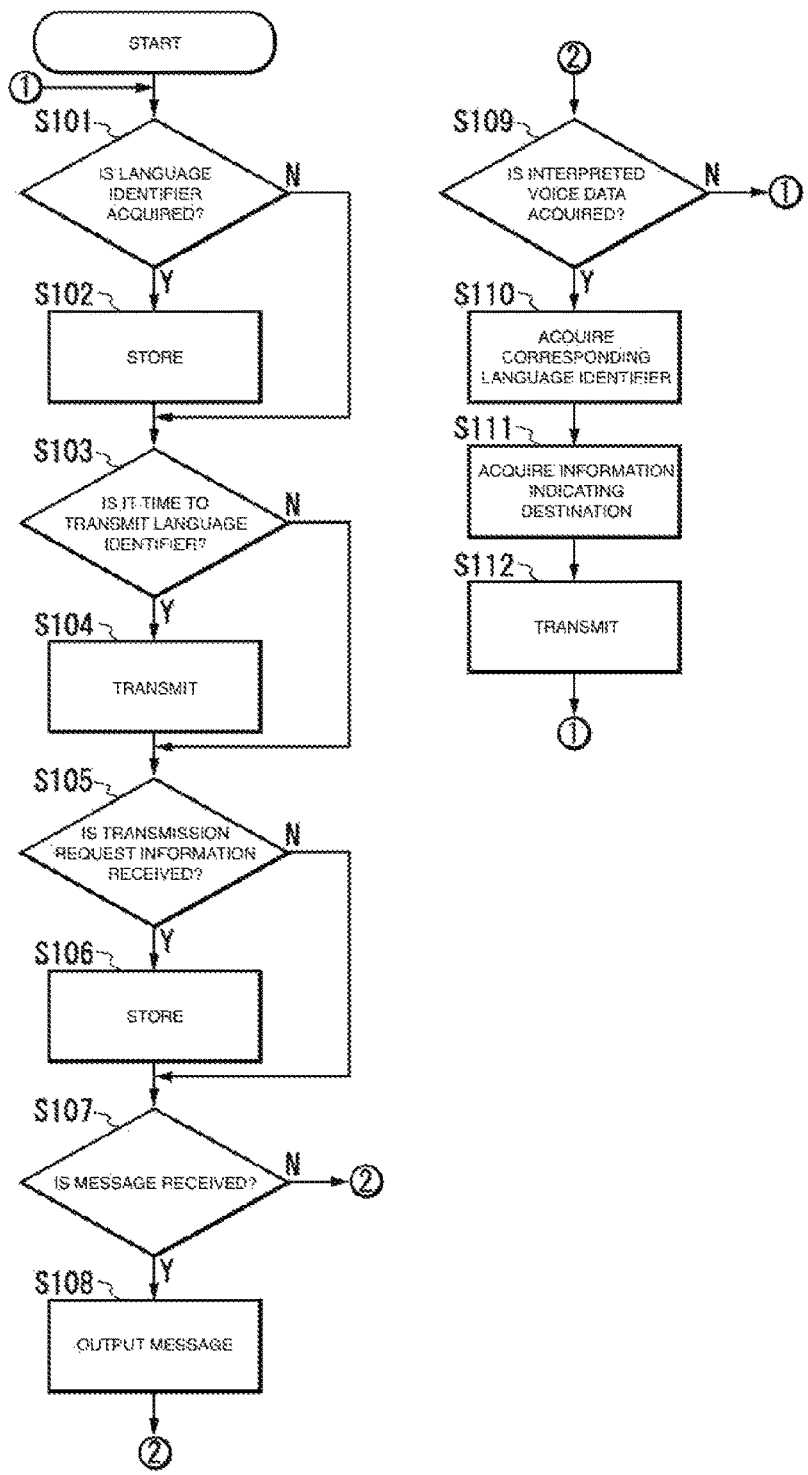
FIG. 2 is a flowchart illustrating an operation of an interpretation distributing device in the interpretation distributing system.

In the flowchart illustrated in FIG. 2, the processes of steps S109 to S119 may be performed in parallel with other processes. After the information indicating the transmission destination corresponding to one language identifier is acquired in step S111 and until new transmission request information is received in step S105, the process of acquiring information indicating the transmission destination is not performed and the transmission destination may be specified in step S112 using the information indicating the transmission destination corresponding to the previously acquired language identifier.

In the flowchart illustrated FIG. 2, the process flow ends when a power supply is turned off or with a process end interrupt.

An example of an operation of a terminal device 21 in the interpretation distributing system 1000 will be described below with reference to the flowchart illustrating in FIG. 3. Here, it is assumed that an interpretation distributing device 11 transmits interpreted voice data in a multicast or unicast manner.

(Step S201) It is determined whether the language identifier receiving unit 201 acquires a language identifier. For example, the language identifier receiving unit 201 receives a language identifier correlated with a device identifier. The process flow moves to step S202 when a language identifier is received, and the process flow moves to step S203 when a language identifier is not received.

(Step S202) The language identifier receiving unit 201 stores the language identifier received in step S201 in a storage unit or the like (not illustrated) in correlation with the device identifier.

(Step S203) The menu constructing unit 202 determines whether to display a menu for designating a language to be heard. For example, when a receiving unit that is not illustrated receives an operation of displaying a menu for designating a language to be heard, it is determined to whether to display the menu. The process flow moves to step S204 when the menu should be displayed, and the process flow moves to step S210 when the menu should not be displayed.

(Step S204) The menu constructing unit 202 constructs a menu for designating a language to be heard using the language identifier stored in step S202. When the language identifier is not stored in step S202, the process flow moves to step S215.

(Step S205) The display unit 203 displays the menu constructed in step S204.

(Step S206) It is determined whether the language designation receiving unit 204 receives an operation of designating a language to be heard for the menu displayed in step S205. For example, it is determined whether an operation of designating one or more menu items is received. The process flow moves to step S207 when the operation is received, and the process flow returns to step S206 when the operation is not received.

(Step S207) It is determined whether the language designation receiving unit 204 receives an operation for recording interpreted voice data in a language to be heard. The process flow moves to step S208 when the operation is received, and the process flow moves to step S209 when the operation is not received.

(Step S208) The language designation receiving unit 204 sets recording of the interpreted voice data in the language to be heard. For example, the language designation receiving unit 204 stores information indicating recording of the interpreted voice data in the language to be heard in a storage unit or the like that is not illustrated.

(Step S209) The transmission request transmitting unit 205 transmits transmission request information including a terminal identifier of a terminal device 21 and a language identifier of the language designated by the operation received in step S207 to the interpretation distributing device 11 indicated by the device identifier correlated with the language identifier. The transmission request information is transmission request information for requesting transmission of the interpreted voice data to be heard. Then, the process flow returns to step S201.

(Step S210) The menu constructing unit 202 determines whether to display a menu for designating a language to be recorded. For example, when a receiving unit that is not illustrated receives an operation of displaying a menu for designating a language to be recorded, it is determined whether to display the menu. The process flow moves to step S211 when the menu should be displayed, and the process flow moves to step S215 when the menu should not be displayed.

(Step S211) The menu constructing unit 202 constructs a menu for designating a language to be recorded using the language identifier stored in step S202. When the language identifier is not stored in step S202, the process flow moves to step S215.

(Step S212) The display unit 203 displays the menu constructed in step S211.

(Step S213) It is determined whether the language designation receiving unit 204 receives an operation of designating one or more languages to be recorded for the menu displayed in step S212. For example, it is determined whether an operation of designating one or more menu items is received. The process flow moves to step S214 when the operation is received, and the process flow returns to step S213 when the operation is not received.

(Step S214) The transmission request transmitting unit 205 transmits transmission request information including a terminal identifier of a terminal device 21 and a language identifier of the language designated by the operation received in step S213 to the interpretation distributing device 11 indicated by the device identifier correlated with the language identifier. The transmission request information is transmission request information for requesting transmission of the interpreted voice data to be recorded. Then, the process flow returns to step S201.

(Step S215) It is determined whether the interpreted voice receiving unit 206 receives interpreted voice data correlated with the language identifier. The process flow moves to step S216 when the interpreted voice data is received, and the process flow moves to step 220 when the interpreted voice data is not received.

(Step S216) The interpreted voice output unit 208 determines whether the interpreted voice data received in step S215 is interpreted voice data to be heard. For example, it is determined whether the received interpreted voice data is the interpreted voice data correlated with the language identifier matching the language identifier of the transmission request information transmitted in step S209, and it is determined that the received interpreted voice data is the interpreted voice data to be heard when the received interpreted voice data is the correlated interpreted voice data. The process flow moves to step S217 when the received interpreted voice data is the interpreted voice data to be heard, and the process flow moves to step S219 otherwise.

(Step S217) The interpreted voice output unit 208 outputs voice using the interpreted voice data received in step S215.

(Step S218) The interpreted voice output unit 208 determines whether recording of the interpreted voice data in the language to be heard is set. For example, it is determined whether information indicating the recording of the interpreted voice data in the language to be heard is stored in a storage unit that is not illustrated, and it is determined that the interpreted voice data should be recorded when the information is stored in the storage unit. The process flow moves to step S219 when the interpreted voice data should be recorded, and the process flow moves to step S201 otherwise.

(Step S219) The interpreted voice output unit 208 stores the interpreted voice data received in step S215 in the interpreted voice storage unit 207. For example, the interpreted voice data received in step S215 is stored in the interpreted voice storage unit 207 in correlation with the language identifier correlated with the device identifier correlated with the interpreted voice data using the information stored in step S202. Then, the process flow returns to step S201.

(Step S220) It is determined whether the message receiving unit 209 receives a message. The process flow moves to step S221 when a message is received, and the process flow returns to step S201 when a message is not received.

(Step S220) The message transmitting unit 211 transmits the message received in step S220 to the interpretation distributing device indicated by the device identifier, which is correlated with the language identifier corresponding to the language to be heard, which is designated by the operation received in step S206 as the device identifier stored in correlation with the language identifier in step S202, in correlation with the user identifier stored in the user identifier storage unit 210. Then, the process flow returns to step S201.

Figure 3:
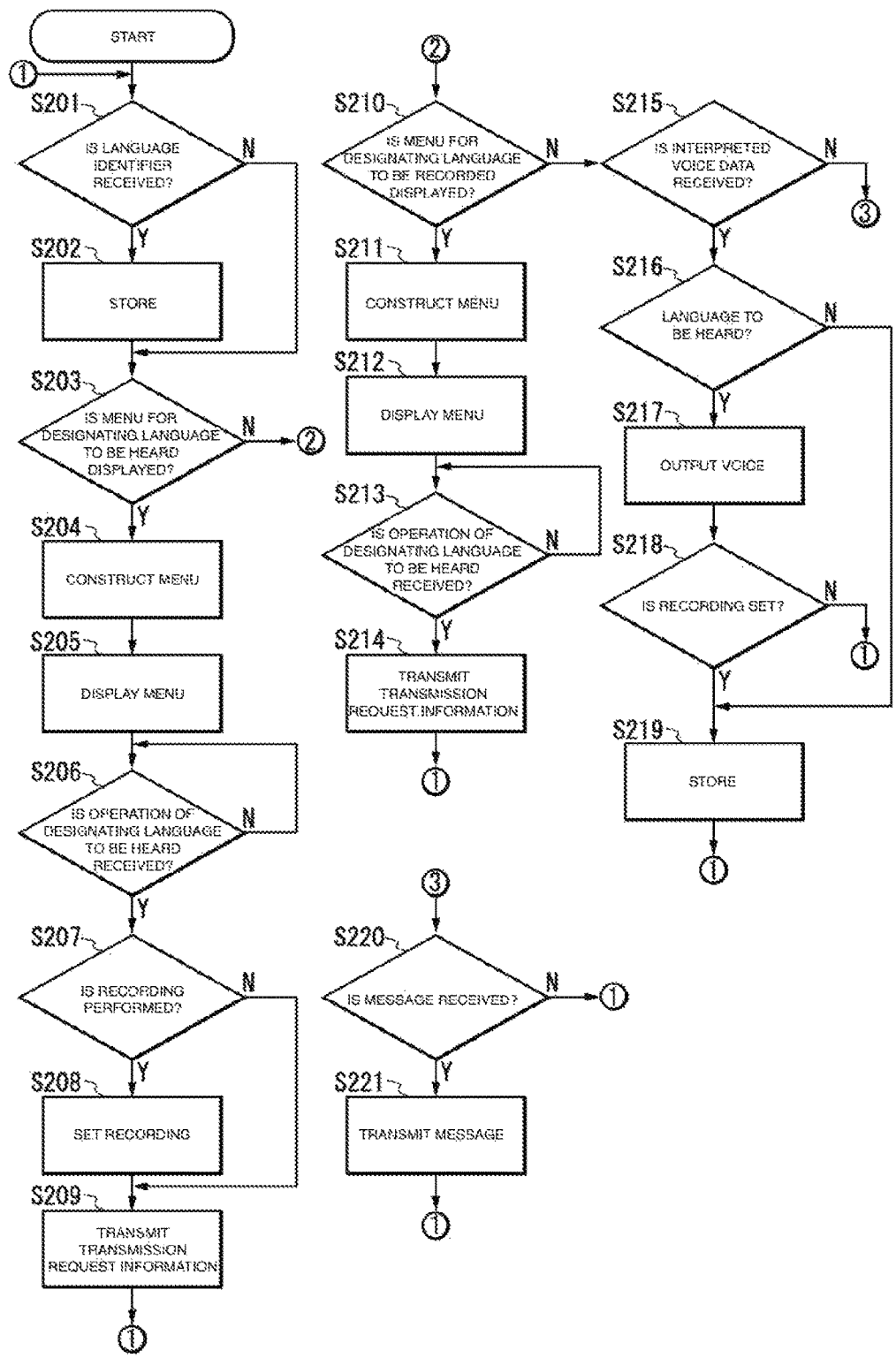
FIG. 3 is a flowchart illustrating an operation of a terminal device in the interpretation distributing system.

In the flowchart illustrated in FIG. 3, the processes of steps S215 to S219 may be performed in parallel with other processes.

In the flowchart illustrated FIG. 3, the process flow ends when a power supply is turned off or with a process end interrupt.

A specific operation of the interpretation distributing system 1000 according to this embodiment will be described below. Here, it is assumed that voice in Japanese as a first language which is uttered by an utterer is simultaneously interpreted into a language other than Japanese at an international conference or the like.

Figure 4:
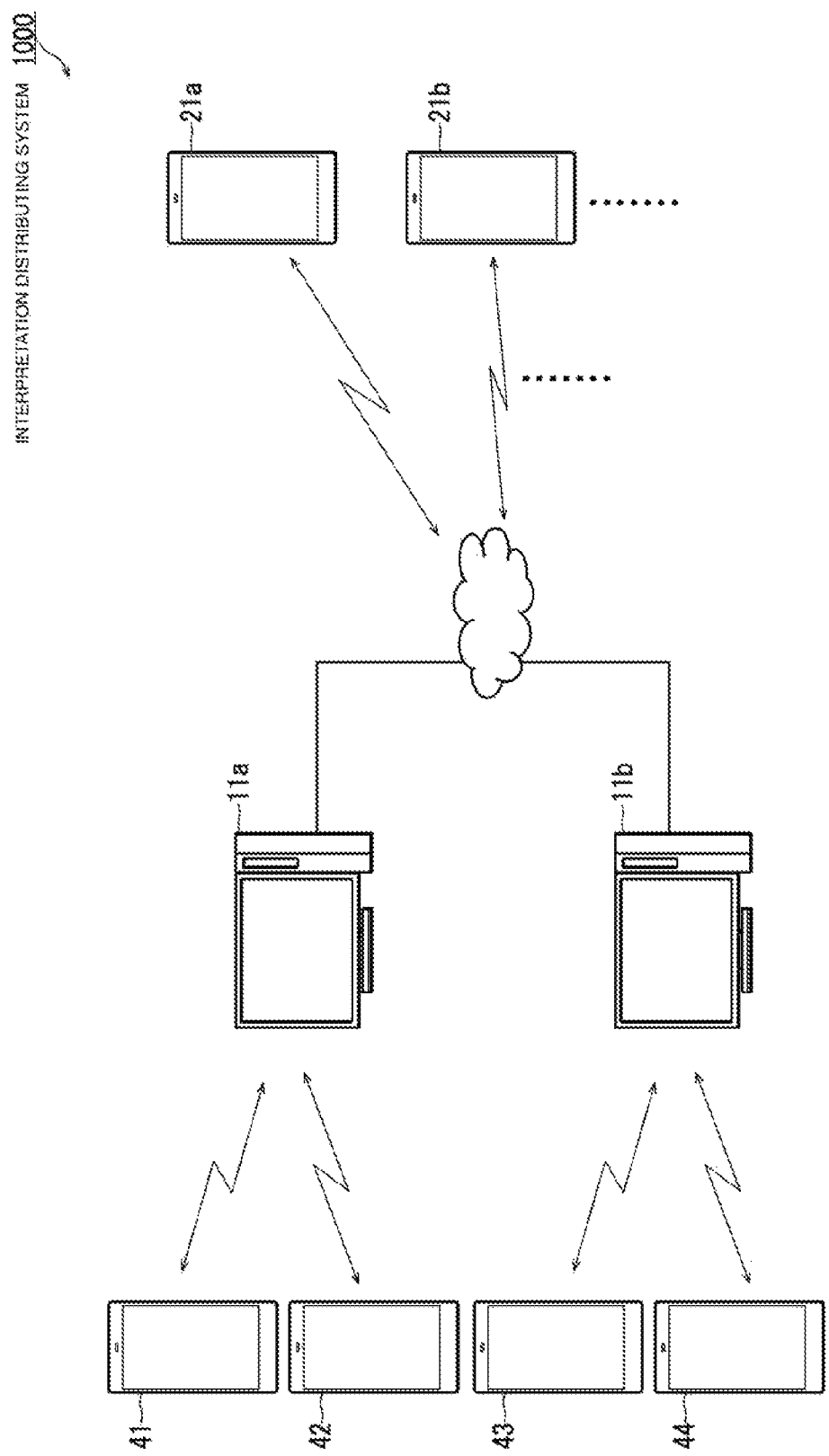
FIG. 4 is a conceptual diagram of the interpretation distributing system.

FIG. 4 is a conceptual diagram of the interpretation distributing system 1000 in the specific example. Here, it is assumed, for example, that the interpretation distributing system 1000 includes a first interpretation distributing device 11a and a second interpretation distributing device 11b as the interpretation distributing device 11. Here, the number of interpretation distributing devices 11 does not matter. In the drawing, portable information terminals 41 to 44 are information processing terminals which are used by interpreters T1 to T4, respectively. The information processing terminal which is used by an interpreter may not be a portable information terminal. Here, it is assumed that the portable information terminals 41 and 42 are connected to the first interpretation distributing device 11a by a radio communication technique such as Bluetooth (registered trademark). It is also assumed that the portable information terminals 43 and 44 are connected to the second interpretation distributing device 11b by a radio communication technique such as Bluetooth (registered trademark). The connection method and the like between the portable information terminals 41 to 44 and the interpretation distributing devices 11 does not matter. Here, it is assumed that the interpretation distributing system 1000 includes a plurality of terminal devices 21. Here, the plurality of terminal devices 21 are described as a terminal device 21a, a terminal device 21b, and the like. The portable information terminals 41 to 44 and the terminal devices 21 are assumed to be so-called smartphones.

For example, it is assumed that an interpreter T1 inputs a language identifier of a language to be interpreted to the portable information terminal 41 which is used by the interpreter T1. For example, when it is assumed that a language identifier indicating English is input, a language receiving unit (not illustrated) of the portable information terminal 41 receives the language identifier "English." A language transmitting unit (not illustrated) of the portable information terminal 41 transmits the language identifier "English" and an interpreter identifier of the interpreter T1 of the portable information terminal 41 to a predetermined first interpretation distributing device 11a. Here, it is assumed that the interpreter identifier is "T1001."

The language identifier acquiring unit 103 of the first interpretation distributing device 11a receives and acquires a set of the language identifier "English" and the interpreter identifier "T1001," which are transmitted from the portable information terminal 41. The acquired language identifier "English" and the interpreter identifier "T1001" are stored in a storage unit (not illustrated) in correlation with each other.

FIG. 5 illustrates a language identifier management table for managing language identifiers stored in a storage unit (not illustrated) of the first interpretation distributing device 11a. The language identifier management table has attributes of "language ID" and "interpreter ID." The "language ID" is a language identifier. The "interpreter ID" is an interpreter identifier. Here, it is assumed that a record (row) including a language identifier "Chinese" and an interpreter identifier "T1002" of the interpreter T2 transmitted from the portable information terminal 42 is stored in advance.

The language identifier transmitting unit 104 of the first interpretation distributing device 11a transmits the attribute values "Chinese" and "English" of the "language ID" in the records (rows) of the language identifier management table illustrated in FIG. 5 in correlation with the device identifier of the first interpretation distributing device 11a in a broadcast manner, for example, at predetermined time intervals. Here, it is assumed that the device identifier of the first interpretation distributing device 11a is an IP address "xxx.xxx.112.011" of the first interpretation distributing device 11a. Here, x is an arbitrary numerical value.

When the language identifier receiving unit 201 of the terminal device 21 used by a user A receives a set of the language identifier "Chinese" and the IP address as the device identifier of the first interpretation distributing device 11a transmitted by the first interpretation distributing device 11a and a set of the language identifier "English" and the IP address as the device identifier of the first interpretation distributing device 11a, the sets of the received language identifier and the device identifier are temporarily stored in a storage unit that is not illustrated. Thereafter, when a set of a language identifier and a device identifier including the same device identifier as the temporarily stored device identifier is received, the temporarily stored set of the language identifier and the device identifier is updated to the newly received set of the language identifier and the device identifier.

The language identifier receiving unit 201 of the terminal device 21a also receives the set of the language identifier and the device identifier transmitted from the second interpretation distributing device 11b and stores the received set in a storage unit that is not illustrated.

FIG. 6 illustrates a received language identifier management table for managing the newest set of the language identifier and the device identifier received and stored by the language identifier receiving unit 201. The received language identifier management table has attributes of a "language ID" as the language identifier and a "device ID" as the device identifier.

When the user A performs an operation of displaying a menu for selecting a language to be heard on the terminal device 21a to hear interpreted voice, the menu constructing unit 202 reads the attribute value of the "language ID" of each record (row) in the newest received language identifier management table illustrated in FIG. 6 and constructs a menu for designating a language to be heard, which includes menu items corresponding to the attribute values of the "language ID." Here, a menu including menu items in which the read attribute values are arranged in a template or the like prepared in advance in a storage unit or the like that is not illustrated is constructed. The menu items are correlated with the arranged language identifiers.

The display unit 203 displays an image of the menu for designating a language to be heard, which is constructed by the menu constructing unit 202, on a monitor having a touch panel (not illustrated) disposed in the terminal device 21a.

Figure 7:
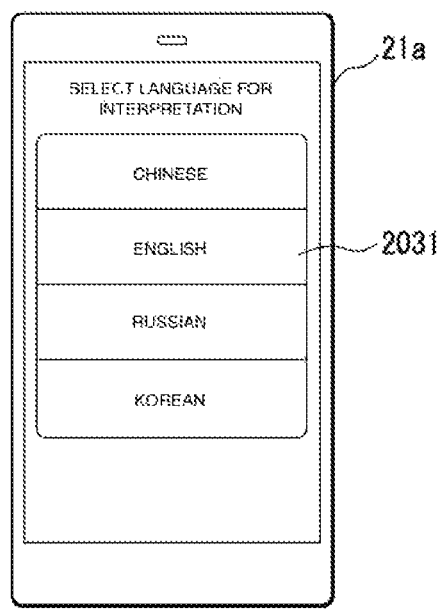
FIG. 7 is a diagram illustrating a display example of a terminal device in the interpretation distributing system.

FIG. 7 is a diagram illustrating a display example of the menu for designating a language to be heard in the terminal device 21a.

When the user A performs an operation of designating a menu item 2031 indicating "English," that is, taps the menu item 2031 with a finger, to hear voice interpreted in English, the language designation receiving unit 204 receives the operation as an operation of designating "English" as a language to be heard.

The display unit 203 of the terminal device 21a displays a predetermined selection screen for receiving designation of whether to record interpreted voice data in the designated language to be heard on the monitor having a touch panel (not illustrated) disposed in the terminal device 21a.

Figure 8:
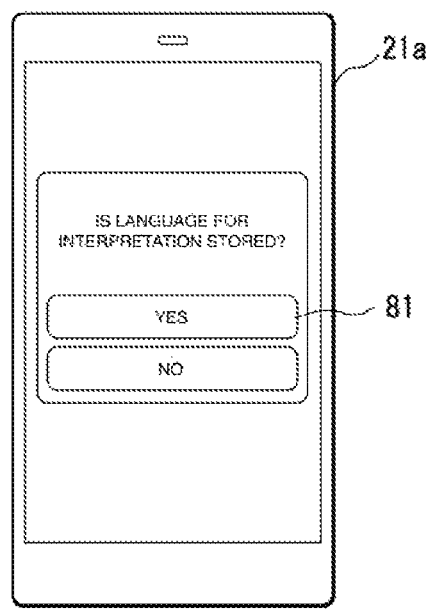
FIG. 8 is a diagram illustrating a display example of a terminal device in the interpretation distributing system.

FIG. 8 is a diagram illustrating a display example of a selection screen for receiving designation of whether to record interpreted voice data in the designated language to be heard.

For example, when a user pushes a button 81 indicating recording on the selection screen illustrated in FIG. 8, the language designation receiving unit 204 stores information (for example, flag information indicating recording) for setting recording to the interpreted voice data in the language to be heard in a storage unit that is not illustrated.

The transmission request transmitting unit 205 acquires "English" as the language identifier corresponding to the menu item indicated by the operation received by the language designation receiving unit 204, that is, the tapped menu item. The transmission request transmitting unit 205 reads the device identifier "xxx.xxx.112.011" corresponding to the language identifier "English" from the received language identifier management table illustrated in FIG. 6. Then, the transmission request transmitting unit 205 transmits transmission request information including the acquired language identifier "English" and the IP address "xxx.xxx.155.123" of the terminal device 21a as a host device, which is stored in advance in a storage unit or the like (not illustrated), to the interpretation distributing device 11a indicated by the IP address which is the acquired device identifier.

The language identifier included in the transmitted transmission request information is stored in a storage unit or the like (not illustrated) by the transmission request transmitting unit 205 for use in determination of whether the interpreted voice data received by the interpreted voice receiving unit 206 is interpreted voice data to be heard. Similarly, the IP address which is the terminal identifier of the transmission destination of the transmission request information is also stored in the storage unit or the like (not illustrated) for use as a transmission destination of the message.

When the user A performs an operation of designating interpreted voice data to be recorded on the terminal device 21a in order to record the interpreted voice data in another language without outputting voice, the menu constructing unit 202 constructs a menu for designating interpreted voice data to be recorded through the above-mentioned processes, and the display unit 203 displays the constructed menu as illustrated in FIG. 7. Here, it is preferable that the constructed menu be a menu from which a language already designated to be recorded is excluded, specifically, a menu from which the menu item corresponding to the language already designated to be recorded is excluded.

When the user A performs an operation of designating the menu item indicating "Chinese," that is, taps the menu item with a finger, in order to record voice interpreted into Chinese, the language designation receiving unit 204 receives the operation as an operation for designating "Chinese" as a language to be recorded. The language designation receiving unit 204 may receive designation of a plurality of languages as the language to be recorded.

As described above, the transmission request transmitting unit 205 acquires "Chinese" which is the language identifier corresponding to the menu item indicated by the operation received by the language designation receiving unit 204. The transmission request transmitting unit 205 reads the device identifier "xxx.xxx.112.011" corresponding to the language identifier "Chinese" from the received language identifier management table illustrated in FIG. 6. The transmission request transmitting unit 205 transmits the transmission request information including the acquired language identifier "Chinese" and the IP address "xxx.xxx.115.123," which is the terminal identifier of the terminal device 21a serving as a host device, stored in advance in the storage unit or the like (not illustrated) to the interpretation distributing device 11a indicated by the IP address which is the acquired device identifier.

The transmission request receiving unit 107 of the interpretation distributing device 11a receives the transmission request information transmitted from the terminal device 21. Here, the transmission request receiving unit 107 receives the transmission request information including the language identifier "English" and the IP address "xxx.xxx.155.123" as the terminal identifier and the transmission request information including the language identifier "Chinese" and the IP address "xxx.xxx.155.123" as the terminal identifier, which are transmitted from the terminal device 21a. The received transmission request information is stored in the storage unit that is not illustrated.

FIG. 9 illustrates a transmission request management table for managing sets of the language identifier and the terminal identifier included in the transmission request information received by the transmission request receiving unit 107. The transmission request management table has attributes of "language ID" and "terminal ID." The "language ID" is a language identifier and the "terminal ID" is a terminal identifier and is an IP address of a terminal device 21. Here, each record (row) corresponds to one piece of transmission request information.

It is assumed that voice uttered in Japanese as a first language by an utterer is interpreted into English by the interpreter T1 and the interpreted voice is input to a microphone (not illustrated) of the portable information terminal 41. Then, a voice receiving unit (not illustrated) of the portable information terminal 41 samples a voice signal of which an input is received by the microphone and acquires interpreted voice data which is the interpreted voice data. A voice transmitting unit (not illustrated) of the portable information terminal 41 transmits the acquired interpreted voice data to the interpretation distributing device 11a in correlation with the interpreter identifier "T1001." For example, the interpreted voice data is transmitted in a streaming manner. The interpreter identifier is added to the header of the interpreted voice data and is transmitted together.

When the interpreted voice acquiring unit 101 of the interpretation distributing device 11a receives the interpreted voice data correlated with the interpreter identifier "T1001" transmitted from the portable information terminal 41, the interpreted voice acquiring unit 101 acquires the attribute value of the "language ID," that is, the language identifier, correlated with the interpreter identifier "T1001" from the language identifier management table illustrated in FIG. 5. Here, the language identifier "English" correlated with the interpreter identifier "T1001" is acquired. The record (row) including "English" as the "language ID" is retrieved from the language identifier management table illustrated in FIG. 9 and the attribute value of the "terminal ID" in the retrieved row is acquired. Here, the IP addresses "xxx.xxx.155.123," "xxx.xxx.155.112," "xxx.xxx.155.098," and the like serving as the "terminal ID" are acquired. The received interpreted voice data is transmitted to the acquired IP addresses as destinations in correlation with the acquired language identifier "English." For example, the interpreted voice data is transmitted in correlation with the header including the language identifier "English" in a streaming manner. Accordingly, it is possible to transmit interpreted voice data of which the language is "English" to the terminal device 21 having transmitted the transmission request information including the language identifier "English."

When the interpreted voice receiving unit 206 of the terminal device 21a receives the interpreted voice data correlated with the language identifier "English" and transmitted to the IP address "xxx.xxx.155.123" as a destination in a streaming manner by the interpretation distributing device 11, the interpreted voice output unit 208 determines whether the received interpreted voice data is the interpreted voice data to be heard. Specifically, it is determined whether the language identifier correlated with the received interpreted voice data matches the language identifier "English" of the language to be heard which is stored in the storage unit (not illustrated) by the transmission request transmitting unit 205 when the transmission request information for the language to be heard is transmitted. Here, since the language identifiers match, it is determined that the received interpreted voice data is the interpreted voice data in the language to be heard. Accordingly, the interpreted voice output unit 208 outputs voice sequentially acquired from the received interpreted voice data from a speaker, an earphone, or the like (not illustrated). As a result, voice interpreted into English is output from the terminal device 21a.

The interpreted voice output unit 208 determines whether information indicating recording of data to be heard is stored in a storage unit (not illustrated). Here, since the information is stored, the interpreted voice output unit 208 stores the received interpreted voice data in the interpreted voice storage unit 207 in correlation with the language identifier "English." Accordingly, the concurrently output voice interpreted in English can be recorded.

When it is assumed that voice uttered by an utterer in Japanese as a first language is interpreted into Chinese by the interpreter T2 and the interpreted voice is input to a microphone (not illustrated) of the portable information terminal 42, the interpreted voice data is transmitted to the interpretation distributing device 11a in correlation with the interpreter identifier "T1002" of the interpreter T2.

In the interpretation distributing device 11 having received the interpreted voice data, as described above, the interpreted voice transmitting unit 102 acquires the language identifier "Chinese" corresponding to the interpreter identifier, acquires the IP address "xxx.xxx.155.123" serving as the "terminal ID" or the like corresponding to "Chinese" from the transmission request management table illustrated in FIG. 9, and transmits the received interpreted voice data to the IP address in correlation with the language identifier "Chinese."

When the interpreted voice receiving unit 206 of the terminal device 21a receives the interpreted voice data correlated with the language identifier "Chinese" and transmitted to the IP address "xxx.xxx.155.123" as a destination in a streaming manner by the interpretation distributing device 11, the interpreted voice output unit 208 determines whether the language identifier correlated with the received interpreted voice data matches the language identifier "English" of the language to be heard which is stored in the storage unit (not illustrated) by the transmission request transmitting unit 205 at the time of transmission of the transmission request information for the language to be heard. Here, since the language identifiers do not match, it is determined that the received interpreted voice data is not the interpreted voice data in the language to be heard. Accordingly, the interpreted voice output unit 208 stores voice acquired from the sequentially received interpreted voice data in the interpreted voice storage unit 207 in correlation with the language identifier "Chinese." As a result, it is possible to record voice in Chinese which is voice other than the concurrently output voice interpreted into English. The recorded voice can be reproduced by performing a predetermined operation. Alternatively, the voice data can be output to another device or a recording medium, similarly to normal voice data.

When the user A feels that the voice in English output from the terminal device 21a is hard to understand because the speech is too fast and thus performs an operation of displaying an input screen for inputting a message, the display unit 203 of the terminal device 21a displays a message input screen.

Figure 10:
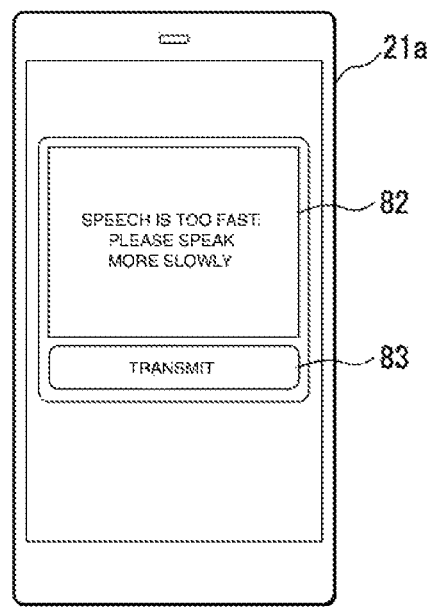
FIG. 10 is a diagram illustrating a display example of a terminal device in the interpretation distributing system.

FIG. 10 is a diagram illustrating a display example of a message input screen in the terminal device 21a.

When the user A inputs a message indicating a decrease in a speed at which the English is spoken to an input box 82 of the message input screen using a screen keyboard or the like (not illustrated), the message receiving unit 209 receives the message input to the input box 82. When the user A pushes a transmission button 83, the message transmitting unit 211 transmits the input message to the interpretation distributing device 11a indicated by the IP address "xxx.xxx.112.011" as the device identifier of the interpretation distributing device 11, which has transmitted the language identifier of the language to be heard stored by the transmission request transmitting unit 205, in correlation with the user identifier stored in the user identifier storage unit 210 and the language identifier "English" of the language to be heard stored by the transmission request transmitting unit 205. The user identifier is, for example, a user name of the user A and is a mail address "USERA@STUV . . . " of the user A here.

When the message transmitted from the terminal device 21a is received, the message receiving unit 105 of the interpretation distributing device 11a acquires the interpreter identifier "T1001" correlated with the language identifier "English" correlated with the received message from the language identifier management table, and transmits the message and the user identifier "USERA@STUV . . . " correlated with the message to the portable information terminal 41 of the interpreter T1 indicated by the interpreter identifier "T1001."

A receiving unit (not illustrated) of the portable information terminal 41 of the interpreter T1 receives the message and the user identifier and a display unit (not illustrated) of the portable information terminal 41 displays the received message and the received user identifier on a monitor (not illustrated) of the portable information terminal 41.

Figure 11:
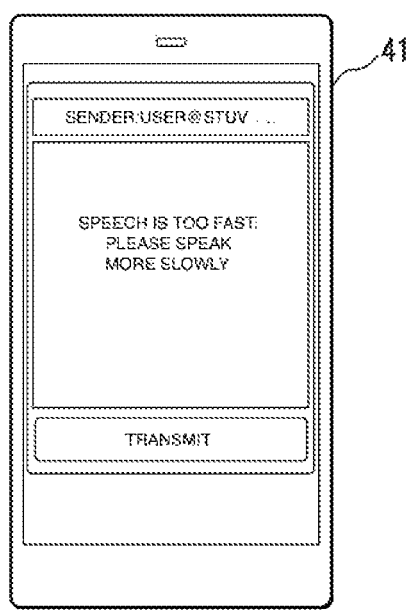
FIG. 11 is a diagram illustrating a display example of a message in the interpretation distributing system.

FIG. 11 is a diagram illustrating a display example of a message in the portable information terminal 41 of the interpreter T1.

According to the above-mentioned embodiment, it is possible to output voice interpreted by a general-purpose terminal device 21 without using a dedicated receiving device.

Embodiment 2

In this embodiment, a control device 32 determines an interpretation distributing device 12 which transmits interpreted voice data to a terminal device 22.

Figure 12:
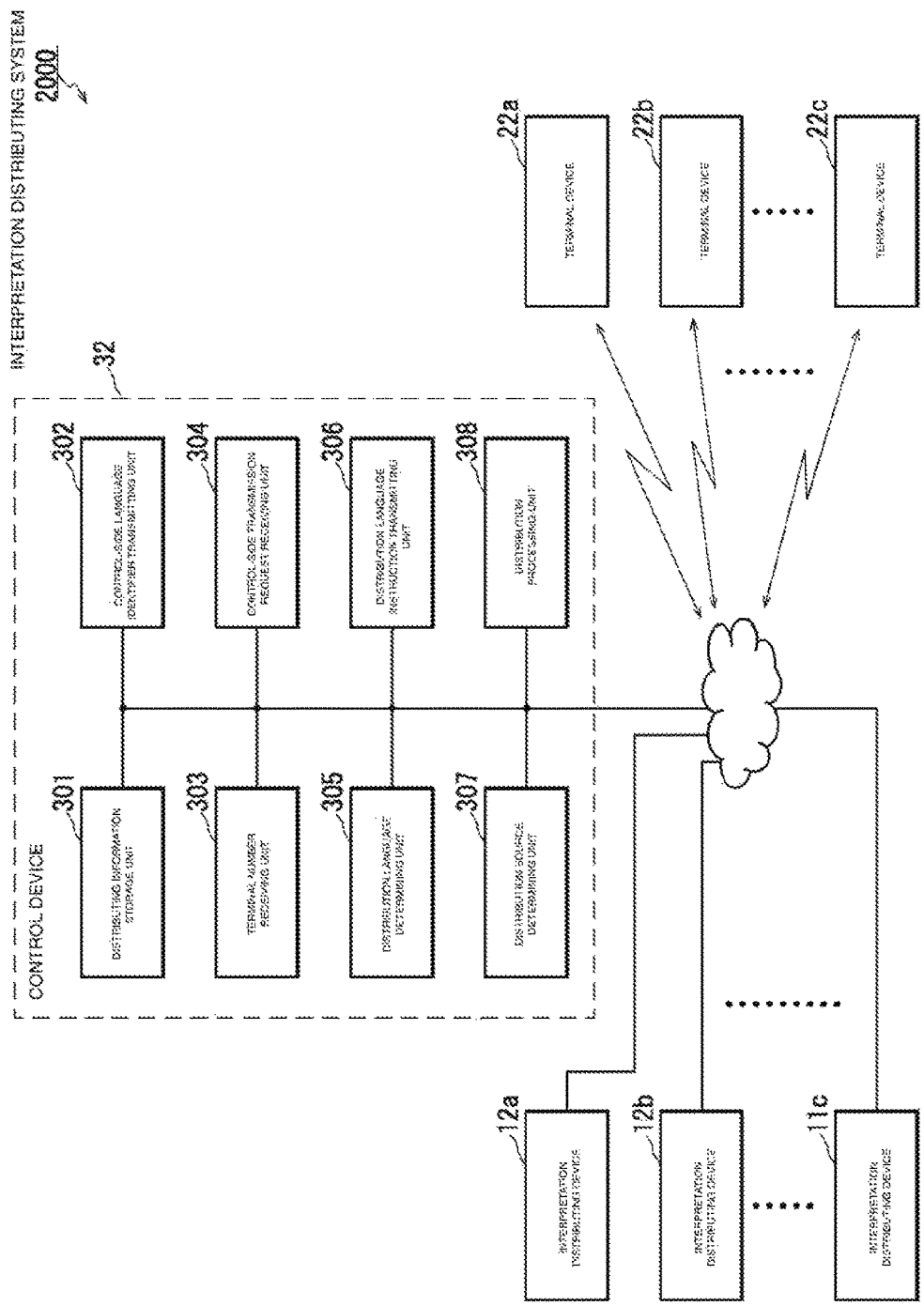
FIG. 12 is a block diagram illustrating details of a control device in an interpretation distributing system according to Embodiment 2 of the present invention.

FIG. 12 is a block diagram of an interpretation distributing system 2000 according to this embodiment and is a block diagram illustrating details of the control device 32.

Figure 13:
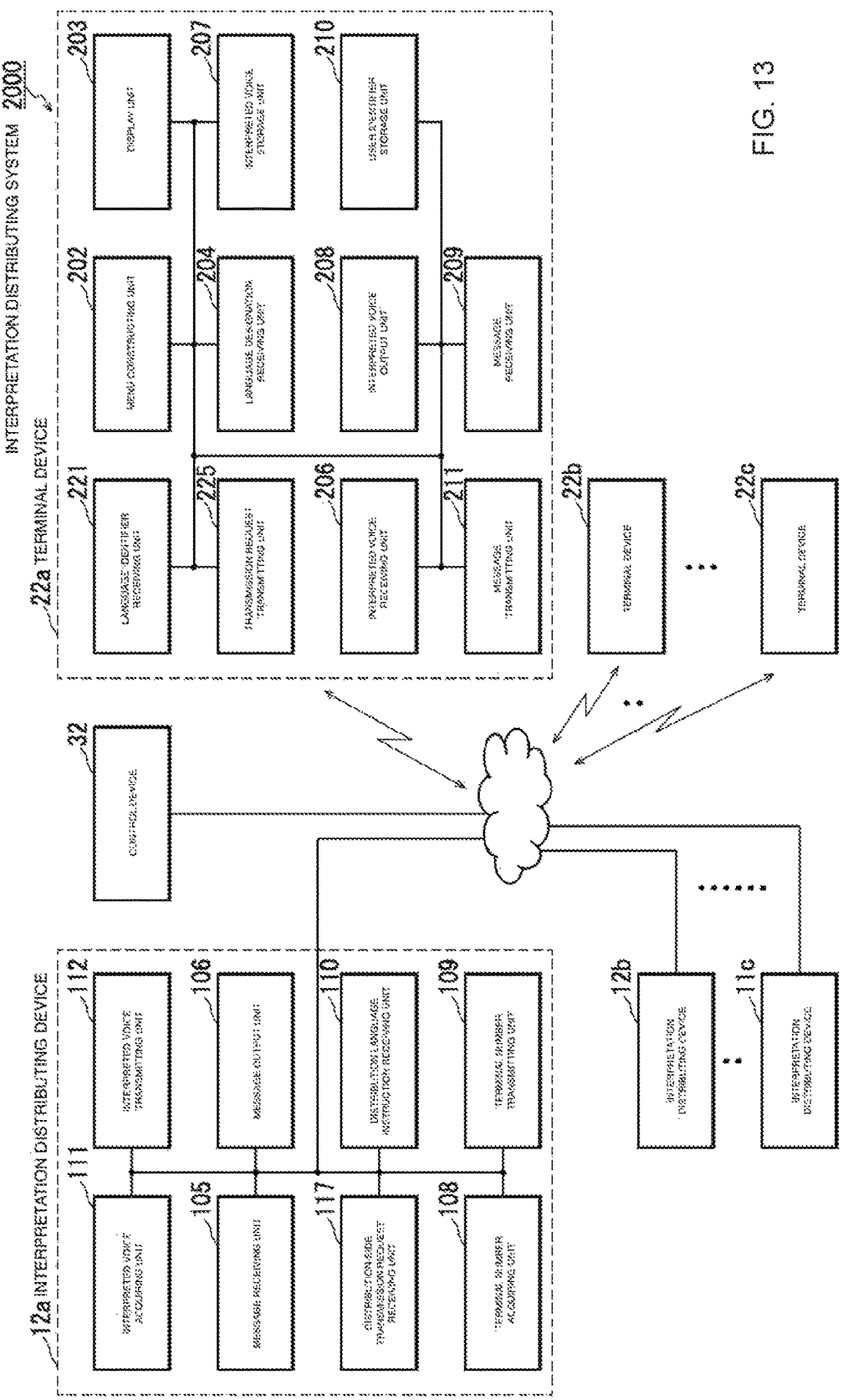
FIG. 13 is a diagram illustrating details of an interpretation distributing device and a terminal device in the interpretation distributing system.

FIG. 13 is a block diagram of the interpretation distributing system 2000 according to this embodiment and is a block diagram illustrating details of an interpretation distributing device 12 and a terminal device 22.

The interpretation distributing system 2000 according to this embodiment includes two or more interpretation distributing devices 12 instead of the one or more interpretation distributing devices 11 in the interpretation distributing system 1000 according to the above-mentioned embodiment, includes two or more terminal devices 22 instead of the one or two or more terminal devices 21, and further includes a control device 32.

The control device 32 includes a distributing device information storage unit 301, a control-side language identifier transmitting unit 302, a terminal number receiving unit 303, a control-side transmission request receiving unit 304, a distribution language determining unit 305, a distribution language instruction transmitting unit 306, a distribution source determining unit 307, and a distribution processing unit 308.

The interpretation distributing device 12 includes a distribution language instruction receiving unit 110, an interpreted voice acquiring unit 111, an interpreted voice transmitting unit 112, a message receiving unit 105, a message output unit 106, a distribution-side transmission request receiving unit 117, a terminal number acquiring unit 108, and a terminal number transmitting unit 109.

The terminal device 22 includes a language identifier receiving unit 221, a menu constructing unit 202, a display unit 203, a language designation receiving unit 204, a transmission request transmitting unit 225, an interpreted voice receiving unit 206, an interpreted voice storage unit 207, an interpreted voice output unit 208, a message receiving unit 209, a user identifier storage unit 210, and a message transmitting unit 211.

The control device 32 can be embodied, for example, by a computer or a server.

Distributing device information which is information on a plurality of interpretation distributing devices 12 of the interpretation distributing system 2000 is stored in the distributing device information storage unit 301. Examples of the distributing device information include the number of interpretation distributing devices 12, the number of terminal devices 22 which can be accessed by the interpretation distributing devices 12, device identifiers of the interpretation distributing devices 12, address information such as IP addresses of the interpretation distributing devices 12, information such as language identifiers which can be transmitted by the plurality of interpretation distributing devices 12, and information indicating languages of interpreted voice data which are transmitted by the interpretation distributing devices 12. The information indicating languages of interpreted voice data which are transmitted by the interpretation distributing devices 12 is information including the device identifiers of the interpretation distributing devices 12 and the language identifiers of one or more languages of the interpreted voice data transmitted from the interpretation distributing devices 12. The information (for example, the IP addresses of the interpretation distributing devices or the language identifiers of the languages of the interpreted voice data transmitted from the interpretation distributing devices 12) on the interpretation distributing devices 12 is stored in correlation with the device identifiers of the interpretation distributing devices 12. The process or timing of storing the distributing device information in the distributing device information storage unit 301 does not matter. For example, a receiving unit that is not illustrated may receive the device identifiers, the language identifiers, or the like transmitted from the interpretation distributing devices 12 and may store distributing device information including the received information. The distributing device information may be appropriately updated.

The control-side language identifier transmitting unit 302 transmits the language identifiers of interpreted voice data in two or more languages, which are transmitted from the plurality of interpretation distributing devices 12 of the interpretation distributing system 2000, to two or more terminal devices 22. For example, the control-side language identifier transmitting unit 302 acquires the language identifiers indicating the languages transmitted from the plurality of interpretation distributing devices 12 from the distributing device information stored in the distributing device information storage unit 301 and transmits the acquired language identifiers. For example, the control-side language identifier transmitting unit 302 transmits one or more language identifiers in a broadcast manner. In this case, the timing at which the control-side language identifier transmitting unit 302 transmits the language identifier in a broadcast manner does not matter. For example, the language identifiers may be repeatedly transmitted at a predetermined periodic timing or at an unspecified timing. When a receiving unit (not illustrated) of the control device 32 receives a request for transmission of a language identifier from one or more terminal devices 22, the control-side language identifier transmitting unit 302 may transmit the language identifier to the terminal device 22 in a multicast or unicast manner. Alternatively, the language identifier may be transmitted to one or more predetermined terminal devices 22 in a multicast or unicast manner. In this case, the timing at which the control-side language identifier transmitting unit 302 transmits the language identifier does not matter. The language identifier is transmitted in correlation with a control device identifier which is an identifier of the control device 32. The control device identifier is, for example, address information such as an IP address or a URI of the interpretation distributing device 11. It is preferable that the control-side language identifier transmitting unit 302 avoid transmitting the same language identifier repeatedly by performing a unique process.

The control-side language identifier transmitting unit 3022 is generally realized by wireless or wired communication means, but may be realized by broadcast means. The control-side language identifier transmitting unit 302 may be considered to include a communication device or may be considered not to include a communication device.

The terminal number receiving unit 303 receives terminal number information which is transmitted from two or more interpretation distributing devices 12. For example, the terminal number information which is transmitted from two or more interpretation distributing device 12 in correlation with the device identifiers is received. The terminal number information is information indicating the number of terminal devices 22 to which the interpretation distributing devices 12 transmit interpreted voice data. When the interpretation distributing devices 12 transmit interpreted voice data in a plurality of different languages, the terminal number information may be information indicating the number of terminal devices 22 to which the interpreted voice data is transmitted for each language. For example, the terminal number receiving unit 303 adds the received terminal number information to the distributing device information stored in the distributing device information storage unit 301 in correlation with the device identifiers. For example, when the terminal number information correlated with the same device identifiers is already stored, the stored terminal number information may be updated to the newly received terminal number information.

The terminal number receiving unit 303 is generally realized by wireless or wired communication means, but may be realized by broadcast receiving means. The terminal number receiving unit 303 may be considered to include a communication device or may be considered not to include a communication device.

In this embodiment, the control device 32 may acquire information of the number of terminal devices 22 to which the interpretation distributing devices 12 distribute the interpreted voice data in each language by allowing the control device 32 to determine an interpretation distributing device 12 transmitting interpreted voice data to a terminal device 22 using the distribution source determining unit 307 or the like. The acquired terminal number information may be used instead of the terminal number information received by the terminal number receiving unit 303. In this case, the terminal number receiving unit 303, the terminal number acquiring unit 108, the terminal number transmitting unit 109, or the like can be omitted.

The control-side transmission request receiving unit 304 receives transmission request information including the language identifier as an identifier of a language and the terminal identifier of the terminal device 22 from each of two or more terminal devices 22. The transmission request information is the same as the transmission request information transmitted from the terminal device 21 in the above-mentioned embodiment, except that the destination is the control device 32.

The control-side transmission request receiving unit 304 is generally realized by wireless or wired communication means, but may be realized by broadcast receiving means. The control-side transmission request receiving unit 304 may be considered to include a communication device or may be considered not to include a communication device.

The distribution language determining unit 305 determines a language of interpreted voice data transmitted from each of a plurality of interpretation distributing devices 12 of the interpretation distributing system 2000 using the distributing device information. For example, the distribution language determining unit 305 determines the language of interpreted voice data transmitted from each of the plurality of interpretation distributing devices 12 using information of the number of interpretation distributing devices 12 in the distributing device information and the number of languages (for example, the number of language identifiers) of interpreted voice data transmitted from the plurality of interpretation distributing devices. For example, the distribution language determining unit 305 assigns the interpretation distributing devices corresponding to the number obtained by dividing the total number of interpretation distributing devices 12 by the number of languages of the interpreted voice data to be transmitted as the interpretation distributing devices.

The language of interpreted voice data which is transmitted from each of the plurality of interpretation distributing devices 12 may be determined using the number of languages of the interpreted voice data transmitted from the plurality of interpretation distributing devices 12, the number of interpretation distributing devices 12 which can simultaneously transmit interpreted voice data in the distributing device information, and the maximum number of accessible terminal devices 22. For example, a value obtained by dividing the total number of interpretation distributing devices 12 which can simultaneously transmit interpreted voice data or the total number of accessible terminal devices 22 by the number of languages of the interpreted voice data transmitted from the plurality of interpretation distributing devices 12 may be acquired and the distribution language determining unit 305 may determine the language of interpreted voice data transmitted from each interpretation distributing device 12 such that the total number of interpretation distributing devices 12 which can simultaneously transmit interpreted voice data for each language or the total maximum number of accessible terminal devices 22 approaches the acquired value.

The distribution language determining unit 305 may determine a language of interpreted voice data which is transmitted from each of the plurality of interpretation distributing devices 12 using the terminal number information received by the terminal number receiving unit 303. Specifically, a language may be determined using the number of terminal devices indicated by the terminal number information. For example, when one or more interpretation distributing devices 12 not transmitting interpreted voice data are prepared among the plurality of interpretation distributing devices 12 and the number of terminal devices 22 serving as a transmission destination of interpreted voice data transmitted from one or more interpretation distributing devices 12 transmitting interpreted voice data in one or more languages is greater than a threshold value set for the interpretation distributing devices 12, the one or more interpretation distributing devices 12 not having transmitted the interpreted voice data may be determined as the interpretation distributing device 12 transmitting the interpreted voice data in one language. Here, the threshold value may be a threshold value of the number of terminal devices, a threshold value of a ratio to the number of terminal devices to which the interpretation distributing devices 12 can transmit interpreted voice data, or the like. For example, the threshold value may be the maximum number of terminal devices 22 accessible by each interpretation distributing device 12*a*.

For example, component ratios of languages of interpreted voice data which are transmitted from the plurality of interpretation distributing devices 12 in the interpretation distributing system 2000 may be calculated using the terminal number information correlated with the respective interpretation distributing devices 12 and the language identifier indicating the language of interpreted voice data transmitted from each interpretation distributing device 12, and the languages which are transmitted from the plurality of interpretation distributing devices 12 may be determined based on the component ratios. When the component ratios are used, the values of the component ratios may be appropriately approximated or may be appropriately subjected to a rounding process such as rounding off, rounding up, or rounding down. In this case, as described above, the component ratio of the interpretation distributing devices 12 distributing interpreted voice data in each language may be determined in consideration of the number of interpretation distributing devices 12 which can simultaneously distribute interpreted voice data or the like. When the number of terminal devices to which each interpretation distributing device 12 transmits interpreted voice data in one language reaches an upper limit of interpreted voice data that one interpretation distributing device 12 can distribute, an interpretation distributing device 12 transmitting interpreted voice data in another language may be changed to the interpretation distributing device 12 transmitting interpreted voice data in the one language.

The distribution language determining unit 305 acquires information indicating the languages of interpreted voice data transmitted from the interpretation distributing devices 12 which have been determined as described above and adds the acquired information to the distributing device information. For example, the distribution language determining unit 305 acquires a plurality of sets of language identifiers of interpreted voice data transmitted from the interpretation distributing devices 12 determined as described above and device identifiers of the interpretation distributing devices 12 as the information indicating the languages of the interpreted voice data transmitted from the interpretation distributing devices 12. The acquired information is added to the distributing device information stored in the distributing device information storage unit 301. For example, when the distributing device information includes the information indicating the languages of the interpreted voice data already transmitted from the interpretation distributing devices 12, the distribution language determining unit 305 may update this information to the newly acquired information indicating the languages transmitted from the interpretation distributing devices 12. For example, the information indicating the languages transmitted from the interpretation distributing devices 12, which was already included in the distributing device information, is default information or information acquired and added immediately before by the distribution language determining unit 305. For example, when the distributing device information does not include the information indicating the languages of the interpreted voice data transmitted from the interpretation distributing devices 12, the distribution language determining unit 305 may newly add the newly acquired information indicating the languages transmitted from the interpretation distributing devices 12.

For example, the language of interpreted voice data transmitted from each interpretation distributing device 12 can be dynamically determined using the distribution language determining unit 305. When it is not necessary to dynamically determine the languages of interpreted voice data transmitted from the interpretation distributing devices 12 (for example, the languages transmitted from the interpretation distributing devices 12 are determined to be predetermined languages as a default), the distribution language determining unit 305 may be omitted.

As the process of causing the distribution language determining unit 305 to determine the languages of interpreted voice data transmitted from the interpretation distributing devices 12, for example, a process of increasing or decreasing the number of assigned servers providing duplication of the same information with an increase or decrease in load in a so-called load balancer can be used.

The timing or trigger upon which the distribution language determining unit 305 performs the process of determining the languages distributed from the interpretation distributing devices 12 does not matter. For example, the process may be performed at predetermined or unspecified time intervals or the process may be performed whenever the control-side transmission request receiving unit 304 receives a predetermined number of pieces of transmission request information. The process may be performed when a predetermined time elapses after the control device 32 receives control request information in a predetermined order.

The distribution language instruction transmitting unit 306 transmits a distribution language instruction, which is an instruction to transmit interpreted voice data in the language determined by the distribution language determining unit 305, to one or more interpretation distributing devices 12. The distribution language instruction is information including the language identifier of the language of the transmitted interpreted voice data. The distribution language instruction transmitting unit 306 may transmit a distribution language instruction to transmit interpreted voice data in the languages determined for all the interpretation distributing devices 12 of the interpretation distributing system 2000 by distribution language determining unit 305 to all the interpretation distributing devices 12. The distribution language instruction may be transmitted to only the interpretation distributing devices 12 for which the language determined by the distribution language determining unit 305 is different from a language of interpreted voice data previously designated for transmission. The previously designated language of interpreted voice data is, for example, a language indicated by the language identifier stored in the distributing device information in correlation with the device identifier.

The distribution language instruction transmitting unit 306 is generally realized by wireless or wired communication means. The distribution language instruction transmitting unit 306 may be considered to include a communication device or may be considered not to include a communication device.

The distribution source determining unit 307 determines an interpretation distributing device 12 transmitting interpreted voice data interpreted in the language indicated by the language identifier of the transmission request information received by the control-side transmission request receiving unit 304 as the interpreted voice data obtained by interpreting voice in the first language using the distributing device information. For example, the distribution source determining unit 307 acquires the device identifier of the determined interpretation distributing device 12.

For example, the distribution source determining unit 307 determines an interpretation distributing device 12 transmitting interpreted voice data to the terminal device 22 indicated by the terminal identifier of the transmission request information among the interpretation distributing devices 12 transmitting the interpreted voice data in the language indicated by the language identifier of the transmission request information received by the control-side transmission request receiving unit 304 among the plurality of interpretation distributing devices 12 using the distributing device information. For example, among the interpretation distributing devices 12 transmitting interpreted voice data in the language indicated by the language identifier of the transmission request information, one interpretation distributing device 12 is detected randomly or in accordance with a predetermined rule, and the detected interpretation distributing device 12 is determined as a distribution source of the interpreted voice data. The language of the interpreted voice data distributed by each interpretation distributing device 12 can be determined, for example, using information including the device identifier of the distributing device information and the language identifier of the language of the interpreted voice data transmitted from the interpretation distributing device 12 indicated by the device identifier in correlation with each other. The predetermined rule is, for example, a rule of determining the interpretation distributing device 12 in a predetermined order. The predetermined rule may be a rule of determining an interpretation distributing device 12 sequentially from the smallest number of terminals indicated by the terminal number information corresponding to each interpretation distributing device 12 or sequentially from the lowest ratio of the number of terminals indicated by the terminal number information to the number of terminals accessible by each interpretation distributing device 12. As the process of causing the distribution source determining unit 307 to determine the interpretation distributing device 12 as a transmission source of interpreted voice data, a known process of determining a server as a user's access destination among servers providing the same information or the like, for example, in a so-called load balancer, can be used.

The process of detecting one or more interpretation distributing devices 12 transmitting interpreted voice data in the language indicated by the language identifier of the transmission request information received by the control-side transmission request receiving unit 304 among a plurality of interpretation distributing devices 12 can be realized, for example, by acquiring the device identifier correlated with the language identifier of the transmission request information received by the control-side transmission request receiving unit 304 from information indicating the language of the interpreted voice data transmitted from the interpretation distributing devices 12, which includes one or more sets of a device identifier and a language identifier of the distributing device information.

For example, among two or more interpretation distributing devices 12 in which a language of interpreted voice data to be transmitted is designated as a default by the distributing device information, the distribution source determining unit 307 may determine one interpretation distributing device 12 transmitting interpreted voice data to the terminal device 22 indicated by the terminal identifier of the transmission request information as described above among the interpretation distributing devices 12 transmitting interpreted voice data in the language indicated by the language identifier of the transmission request information received by the control-side transmission request receiving unit 304. For example, when the distribution language determining unit 305 is omitted or when the language of interpreted voice data transmitted from each interpretation distributing device 12 is not determined by the distribution language determining unit 305, the distribution source determining unit 307 performs this process.

The distribution source determining unit 307 may determine the interpretation distributing device 12 transmitting interpreted voice data to the terminal device 22 indicated by the terminal identifier of the transmission request information among one or more interpretation distributing devices 12 transmitting interpreted voice data in the language indicated by the language identifier of the transmission request information received by the control-side transmission request receiving unit 304, for example, using the distributing device information added by the distribution language determining unit 305. For example, the distribution source determining unit 307 may detect one or more interpretation distributing devices 12 transmitting interpreted voice data in the language indicated by the language identifier of the transmission request information received by the control-side transmission request receiving unit 304 using information indicating the language of the interpreted voice data transmitted from each interpretation distributing device 12, which is included in the distributing device information stored and updated by the distribution language determining unit 305, and may determine the interpretation distributing device 12 transmitting interpreted voice data to the terminal device 22 indicated by the terminal identifier of the transmission request information as described above among the detected one or more interpretation distributing devices 12. For example, when the distribution language determining unit 305 is provided and the language of interpreted voice data transmitted from each interpretation distributing device 12 is determined by the distribution language determining unit 305, the distribution source determining unit 307 may perform this process.

The distribution processing unit 308 performs a process of transmitting interpreted voice data interpreted in the language indicated by the language identifier of the transmission request information from the interpretation distributing device 12 determined by the distribution source determining unit 307 to the terminal device 22 indicated by the terminal identifier of the transmission request information. Here, the process is transmission of information for transmitting interpreted voice data. Specifically, the distribution processing unit 308 transmits information including the language identifier and the terminal identifier of the transmission request information received by the control-side transmission request receiving unit 304 to the interpretation distributing device 12 determined by the distribution source determining unit 307. Here, the information including the language identifier and the terminal identifier transmitted from the distribution processing unit 308 is referred to as control-side transmission request information. The control-side transmission request information may be the same information as the transmission request information received by the control-side transmission request receiving unit 304. When the interpretation distributing device 12 determined by the distribution source determining unit 307 transmits interpreted voice data in only one language, the control-side transmission request information may not include the language identifier. The control-side transmission request information may include an instruction or a command or the like for transmitting interpreted voice data.

The distribution processing unit 308 may transmit the device identifier or the like of the interpretation distributing device 12 determined by the distribution source determining unit 307 to the terminal device 22 indicated by the terminal identifier of the transmission request information received by the control-side transmission request receiving unit 304, and the terminal device 22 may transmit an instruction or the like to transmit interpreted voice data in the language indicated by the language identifier of the transmission request information to the interpretation distributing device 12 indicated by the received device identifier. Alternatively, the terminal device 22 may receive only interpreted voice data transmitted from the interpretation distributing device 12 indicated by the received device identifier in a broadcast manner. In this case, the interpretation distributing device 12 or the terminal device 22 may be provided with the same configuration for receiving interpreted voice data corresponding to the transmission request information or the same configuration for receiving interpreted voice data in the language designated by a user from the broadcast interpreted voice data as the interpretation distributing device 11 or the terminal device 21.

The distribution processing unit 308 is generally realized by wireless or wired communication means. The distribution processing unit 308 may be considered to include a communication device or may be considered not to include a communication device.

The interpretation distributing device 12 is, for example, a server device that can distribute voice data. The interpretation distributing device 12 is embodied by a computer or the like.

The distribution language instruction receiving unit 110 receives a distribution language instruction from the distribution language instruction transmitting unit 306 of the control device 32. For example, the distribution language instruction receiving unit 110 stores the received distribution language instruction in a storage unit or the like (not illustrated). The distribution language instruction receiving unit 110 is generally realized by wireless or wired communication means. The distribution language instruction receiving unit 110 may be considered to include a communication device or may be considered not to include a communication device.

The interpreted voice acquiring unit 111 acquires interpreted voice data corresponding to one or more language identifiers of the distribution language instruction received by the distribution language instruction receiving unit 110. For example, among the interpreted voice data transmitted in a broadcast or multicast manner from an information processing terminals of interpreters or the like that are not illustrated, interpreted voice data corresponding to one or more language identifiers of the distribution language instruction is acquired. For example, when the interpreted voice data is transmitted in correlation with the language identifiers, only the interpreted voice data transmitted in correlation with the language identifier matching any one of the one or more language identifiers of the distribution language instruction may be received. For example, when the interpreted voice data is transmitted in correlation with the interpreter identifiers, one or more sets of the interpreter identifier and the language identifier of the language interpreted by the corresponding interpreter may be stored in advance in a storage unit or the like (not illustrated), the language identifier corresponding to the interpreter identifier correlated with the interpreted voice data received from an information processing terminal (not illustrated) of the interpreter by the interpreted voice acquiring unit 111 may be acquired from the one or more sets, and the interpreted voice data may be received only when the language identifier matches any one of the one or more language identifiers of the distribution language instruction.

When the interpreter identifier of the interpreter is address information such as an IP address of the information processing terminal of the interpreter, a plurality of sets of an interpreter identifier and a language identifier of the language interpreted by the interpreter indicated by the interpreter identifier may be stored in advance in a storage unit or the like (not illustrated), the interpreter identifier corresponding to any one of the one or more language identifiers of the distribution language instruction may be acquired from the sets, information for requesting for transmission of interpreted voice data may be transmitted to the information processing terminal of the interpreter indicated by the interpreter identifier, and the interpreted voice data may be received from the information processing terminal.

When one or more interpretation distributing devices 12 are determined in advance to receive interpreted voice data in a predetermined language from specific interpreters, a plurality of sets of a device identifier of an interpretation distributing device 12 receiving interpreted voice data in the predetermined language and a language identifier in a language received by the interpretation distributing device 12 may be stored in advance in a storage unit (not illustrated), the device identifier corresponding to any one of the one or more language identifiers of the distribution language instruction may be acquired from the plurality of sets, and the interpreted voice data received by the interpretation distributing device 12 may be received from the interpretation distributing device 12 indicated by the device identifier.

The other configurations or the like of the interpreted voice acquiring unit 111 are the same as those of the above-mentioned interpreted voice acquiring unit 101 and thus detailed description thereof will not be repeated herein.

The distribution-side transmission request receiving unit 117 receives control-side transmission request information transmitted from the control device 32. For example, the distribution-side transmission request receiving unit 117 stores the received control-side transmission request information in a storage unit or the like (not illustrated). The distribution-side transmission request receiving unit 117 is generally realized by wireless or wired communication means. The distribution-side transmission request receiving unit 117 may be considered to include a communication device or may be considered not to include a communication device.

The interpreted voice transmitting unit 112 transmits interpreted voice data in a language indicated by the language identifier of the control-side transmission request information received by the distribution-side transmission request receiving unit 117 among the interpreted voice data acquired by the interpreted voice acquiring unit 111 to the terminal device 22 indicated by the terminal identifier of the control-side transmission request information. For example, the interpreted voice transmitting unit 112 transmits interpreted voice data in correlation with a device identifier or a language identifier. This transmission is performed, for example, in a multicast or unicast manner. When the interpreted voice data acquired by the interpreted voice acquiring unit 111 is interpreted voice data in one language, the interpreted voice data acquired by the interpreted voice acquiring unit 111 may be transmitted to the terminal device 22 indicated by the terminal identifier of the control-side transmission request information. In this case, the control-side transmission request information may not include a language identifier. The process of causing the interpreted voice transmitting unit 112 to transmit interpreted voice data in response to the control-side transmission request information is the same as the process of causing the above-mentioned interpreted voice transmitting unit 102 to transmit interpreted voice data in response to the transmission request information and thus detailed description thereof will not be repeated here.

For example, the interpreted voice transmitting unit 112 may transmit the interpreted voice data acquired by the interpreted voice acquiring unit 111 in a broadcast manner in correlation with the device identifier.

The other configurations of the interpreted voice transmitting unit 112 are the same as those of the above-mentioned interpreted voice transmitting unit 102 and thus detailed description thereof will not be repeated.

The terminal number acquiring unit 108 acquires terminal number information indicating the number of terminal devices 22 transmitting interpreted voice data to the terminal devices 22. The terminal number information is information indicating the number of terminals. For example, it is preferable that the number of information pieces (for example, IP addresses of the terminal devices 22) of destinations which are used to transmit the interpreted voice data be counted and a value indicating the counted number be acquired as terminal number information. When one interpretation distributing device 11 transmits interpreted voice data in two or more languages, it is preferable that the terminal number acquiring unit 108 acquire the terminal number information for each language identifier. The timing or trigger upon which the terminal number acquiring unit 108 acquires the terminal number information does not matter. For example, the terminal number information may be acquired just before the timing at which the terminal number information is transmitted.

The terminal number transmitting unit 109 transmits the terminal number information acquired by the terminal number acquiring unit 108. For example, the terminal number transmitting unit 109 transmits the terminal number information in correlation with a device identifier. For example, the terminal number transmitting unit 109 transmits the terminal number information to the control device 32. When one interpretation distributing device 11 transmits interpreted voice data in two or more languages, it is preferable that the terminal number transmitting unit 109 output the terminal number information for each language identifier.

The timing or trigger upon which the terminal number transmitting unit 109 transmits the terminal number information does not matter. For example, the terminal number transmitting unit 109 may transmit the terminal number information at predetermined or unspecified time intervals. Also, the terminal number information may be transmitted when the number of terminals is changed.

The terminal number transmitting unit 109 is generally realized by wireless or wired communication means. The terminal number transmitting unit 109 may be considered to include a communication device or may be considered not to include a communication device.

The terminal device 22 is, for example, a portable information terminal which can be carried by a user similarly to the terminal device 21.

The language identifier receiving unit 221 receives a language identifier from the control device 32 instead of receiving a language identifier from the above-mentioned interpretation distributing device 11 in the language identifier receiving unit 201, and the process of receiving the language identifier, the other configurations, and the like are the same as those of the above-mentioned language identifier receiving unit 201 and thus detailed description thereof will not be repeated here.

The transmission request transmitting unit 225 transmits transmission request information for requesting transmission of interpreted voice data in a language designated by an operation received by the language designation receiving unit 204 to the control device that determines an interpretation distributing device 11 distributing the interpreted voice data requested by the transmission request information. The transmission request transmitting unit 225 transmits the transmission request information to the control device 32, and the process of transmitting the transmission request information, the other configurations, and the like are the same as those of the above-mentioned transmission request transmitting unit 205, and thus detailed description thereof will not be repeated here.

An example of an operation of the control device 32 in the interpretation distributing system 2000 will be described below with reference to the flowchart illustrated in FIG. 14.

(Step S301) It is determined whether it is time for the control-side language identifier transmitting unit 302 to transmit a language identifier. For example, it is determined whether a predetermined time elapses from previous transmission or from startup of the device, and it is determined that it is time to transmit a language identifier when it elapses. The process flow moves to step S302 when it is time to transmit a language identifier, and the process flow moves to step 303 when it is not time to transmit a language identifier.

(Step S302) The control-side language identifier transmitting unit 302 acquires a language identifier of a language of interpreted voice data transmitted from two or more interpretation distributing devices 12 from the distributing device information stored in the distributing device information storage unit 301 and transmits the acquired language identifier in correlation with an identifier such as address information of the control device 32 in a broadcast manner.

(Step S303) It is determined whether the control-side transmission request receiving unit 304 receives transmission request information from a terminal device 22. The process flow moves to step S304 when the transmission request information is received, and the process flow moves to step S306 when the transmission request information is not received.

(Step S304) The distribution source determining unit 307 determines one interpretation distributing device 12 among the interpretation distributing devices 12 transmitting the interpreted voice data in the language indicated by the language identifier of the transmission request information received in step S303 as the interpretation distributing device 12 which is a transmission source transmitting the interpreted voice data to the terminal device 22 indicated by the terminal identifier of the transmission request information. For example, the interpretation distributing device 12 in which the corresponding terminal number information is the smallest is determined.

(Step S305) The distribution processing unit 308 performs a process of transmitting the interpreted voice data in the language indicated by the language identifier of the transmission request information from the interpretation distributing device 12 determined in step S304 to the terminal device 22 indicated by the terminal identifier of the transmission request information. Here, control-side transmission request information including the terminal identifier and the language identifier of the transmission request information is transmitted to the interpretation distributing device 12 determined in step S304.

(Step S306) It is determined whether the terminal number receiving unit 303 receives the terminal number information from the interpretation distributing device 12. The process flow moves to step S307 when the terminal number information is received, and the process flow moves to step S308 when the terminal number information is not received.

(Step S307) The terminal number receiving unit 303 adds the received terminal number information to the distributing device information in correlation with the device identifier.

(Step S308) The distribution language determining unit 305 determines whether it is time to determine languages of interpreted voice data to be distributed by the interpretation distributing devices 12. For example, it is determined whether a predetermined time elapses after the languages are previously determined or after the device is started, and it is determined that it is time to determine the languages when the predetermined time elapses. The process flow moves to step S309 when it is time to determine the languages, and the process flow returns to step S301 when it is not time to determine the languages.

(Step S309) The distribution language determining unit 305 determines the languages of interpreted voice data transmitted from the interpretation distributing devices 12 using the distributing device information. For example, the languages of interpreted voice data transmitted from the interpretation distributing devices 12 are assigned depending on the ratio of the number of interpretation distributing devices transmitting the interpreted voice data for each language.

(Step S310) The distribution language determining unit 305 adds information indicating the languages of the interpreted voice data transmitted from the interpretation distributing devices 12 to the distributing device information.

(Step S311) The distribution language instruction transmitting unit 306 transmits a distribution language instruction, which is an instruction to transmit interpreted voice data in the languages determined for the interpretation distributing devices 12 in step S309, to the interpretation distributing devices 12. Then, the process flow returns to step S301.

Figure 14:
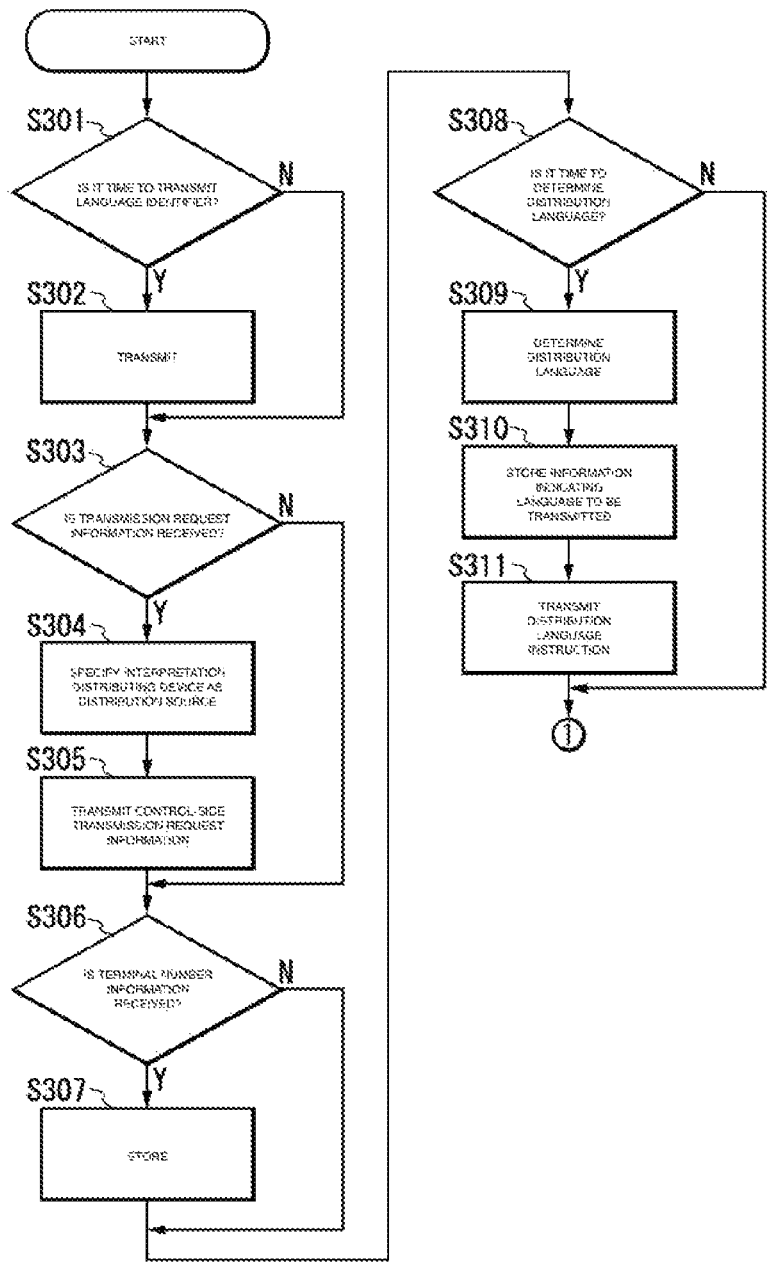
FIG. 14 is a flowchart illustrating an operation of the control device in the interpretation distributing system.

In the flowchart illustrated in FIG. 14, when it is not necessary to change the languages of interpreted voice data transmitted from the interpretation distributing devices 12, the processes of steps S308 to S311 may be skipped.

In the flowchart illustrated in FIG. 14, the process flow ends when a power supply is turned off or with a process end interrupt.

An example of an operation of an interpretation distributing device 12 in the interpretation distributing system 2000 will be described below with reference to the flowchart illustrated in FIG. 15. In the drawing, the steps having the same reference signs as in FIG. 2 denote the same or corresponding processes and detailed description thereof will not be repeated here.

(Step S401) It is determined whether the distribution language instruction receiving unit 110 receives a distribution language instruction from the control device 32. The process flow moves to step S402 when the distribution language instruction is received, and the process flow moves to step S403 when the distribution language instruction is not received.

(Step S402) A transmitting unit or the like (not illustrated) of the interpretation distributing device 12 performs a process of receiving interpreted voice data in the language indicated by the language identifier of the distribution language instruction received in step S401. For example, the interpretation distributing device 12 stores information in which a plurality of interpreter identifiers and the language identifiers of the languages interpreted by the interpreters indicated by the plurality of interpreter identifiers are correlated with each other in a storage unit or the like (not illustrated) in advance, acquires the interpreter identifier corresponding to the language indicated by the language identifier of the distribution language instruction from the storage unit or the like (not illustrated), and transmits information for requesting transmission of interpreted voice data to the interpreter (an information processing terminal (not illustrated) of the interpreter) indicated by the acquired interpreter identifier.

(Step S403) It is determined whether the distribution-side transmission request receiving unit 117 receives the control-side transmission request information from the control device 32. The process flow moves to step S404 when the control-side transmission request information is received, and the process flow moves to step S405 when the control-side transmission request information is not received.

(Step S404) The distribution-side transmission request receiving unit 117 stores the received control-side transmission request information in a storage unit or the like (not illustrated).

(Step S405) It is determined whether the interpreted voice acquiring unit 111 acquires interpreted voice data. For example, it is determined whether interpreted voice data is acquired (for example, received) from information processing devices of one or more interpreters requesting the interpreted voice data in step S402. The process flow moves to step S406 when the interpreted voice data is acquired, and the process flow moves to step S407 when the interpreted voice data is not acquired.

(Step S406) The interpreted voice transmitting unit 112 acquires the language identifier corresponding to the interpreted voice data acquired in step S405. For example, when the interpreted voice data correlated with an interpreter identifier is acquired in step S405, the language identifier correlated with the interpreter identifier is acquired using the information including interpreter identifiers and language identifiers, which is used in step S402 and stored in a storage unit or the like (not illustrated).

(Step S407) The interpreted voice transmitting unit 112 acquires information indicating a transmission destination using the language identifier acquired in step S110. For example, the interpreted voice transmitting unit 112 retrieves one or more pieces of control-side transmission request information including the language identifier acquired in step S406 from the control-side transmission request information stored in step S404, and acquires the terminal identifier included in the detected control-side transmission request information as the information indicating a terminal device 22 of a transmission destination.

(Step S408) The interpreted voice transmitting unit 112 transmits the interpreted voice data received in step S405 to the transmission destination, that is, the terminal device 22, indicated by the information indicating the transmission destination which is acquired in step S407. For example, this transmission is performed in a streaming manner.

(Step S409) The terminal number acquiring unit 108 determines whether it is time to acquire the terminal number information. The process flow moves to step S410 when it is time to acquire the terminal number information, and the process flow moves to step S107 when it is not time to acquire the terminal number information.

(Step S410) The terminal number acquiring unit 108 acquires the terminal number information.

(Step S411) The terminal number transmitting unit 109 transmits the terminal number information acquired in step S410 to the control device 32. Then, the process flow moves to step S107.

Figure 15:
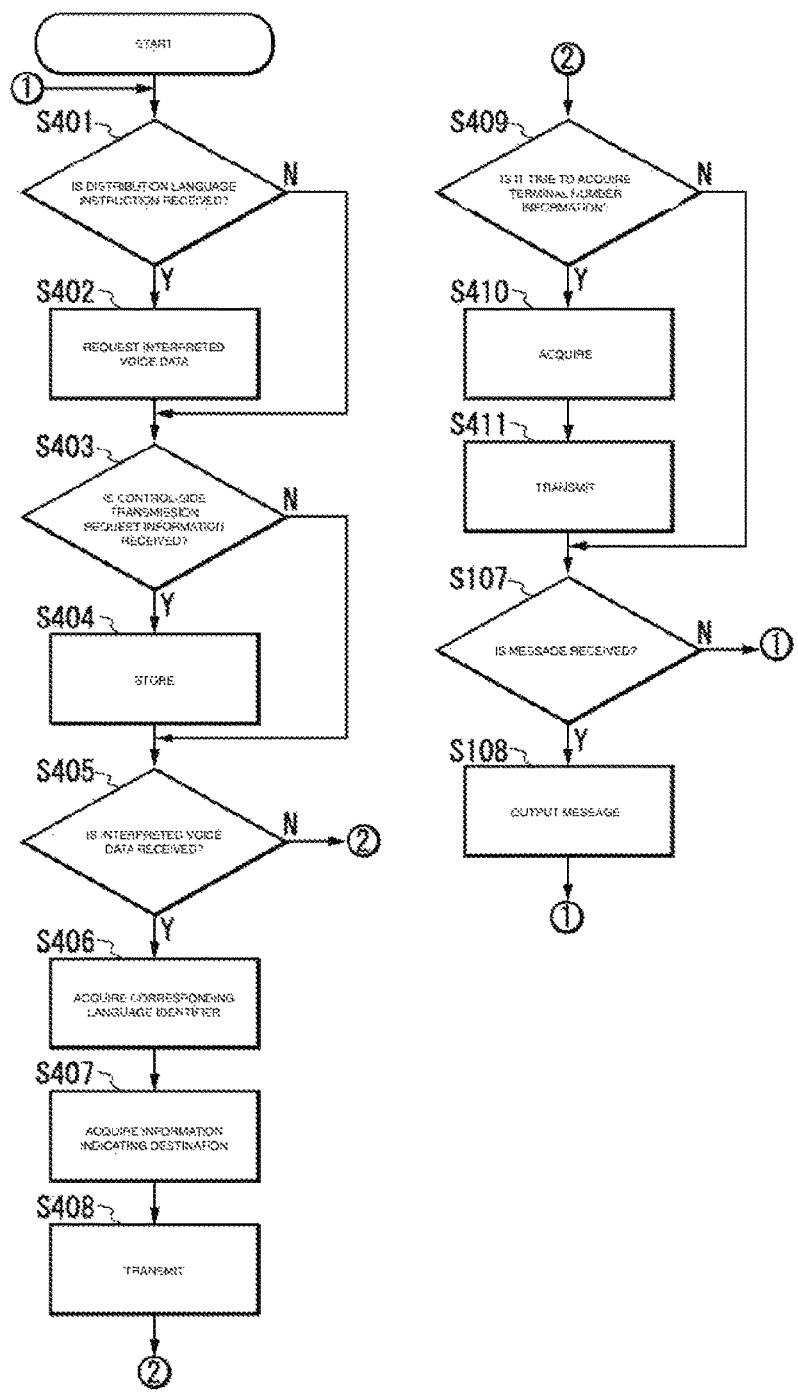
FIG. 15 is a flowchart illustrating an operation of an interpretation distributing device in the interpretation distributing system.

In the flowchart illustrated in FIG. 15, the process flow ends when a power supply is turned off or with a process end interrupt.

The operation of a terminal device 22 in the interpretation distributing system 2000 according to this embodiment is the same as in the process flow illustrated in FIG. 3, except that the transmission request information is transmitted to the control device 32 or the language identifier receiving unit 221 receives the language identifier from the control device 32, and thus detailed description thereof will not be repeated here.

A specific operation of the interpretation distributing system 2000 according to this embodiment will be described below.

Figure 16:
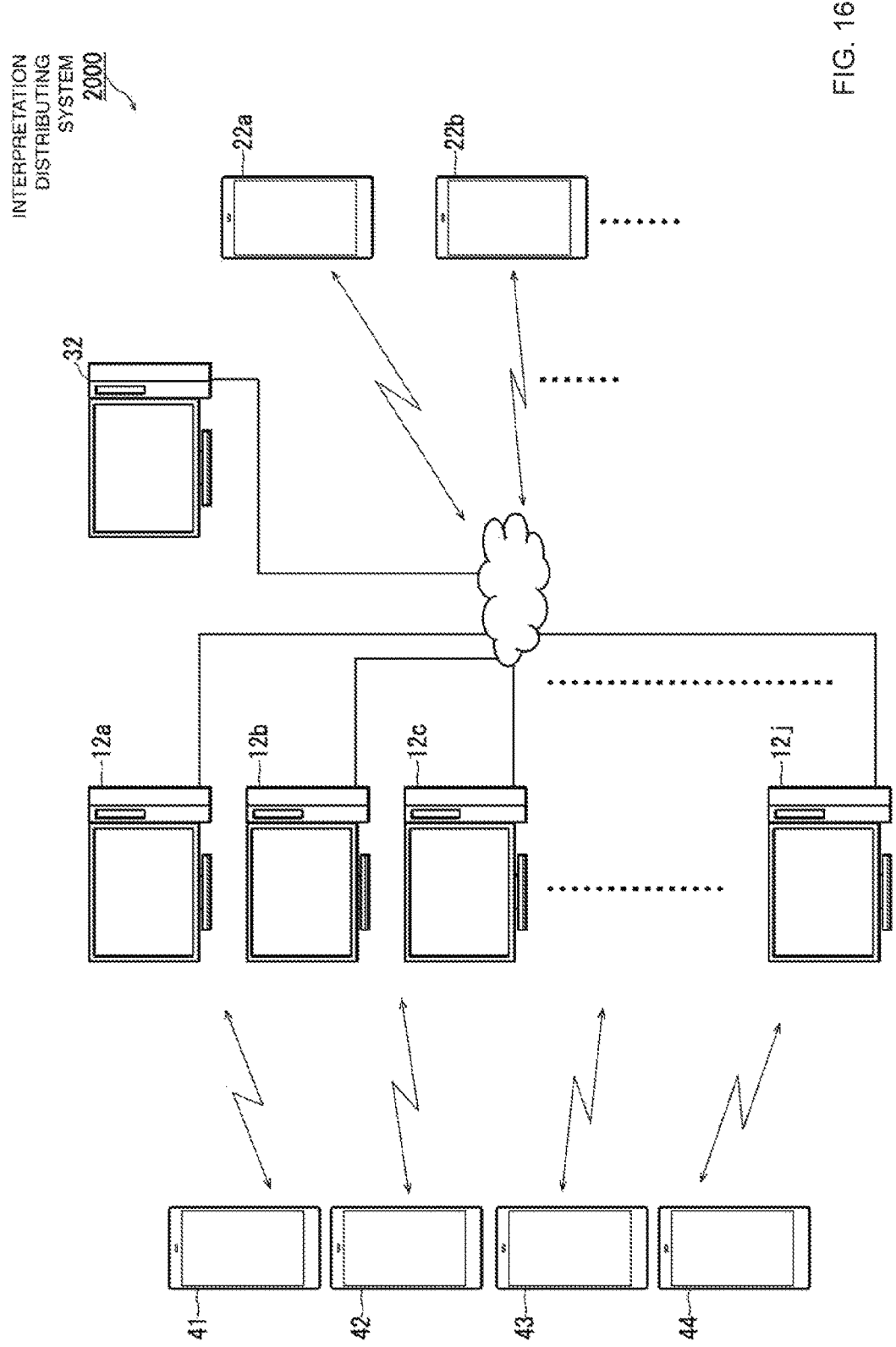
FIG. 16 is a conceptual diagram of the interpretation distributing system.

FIG. 16 is a conceptual diagram illustrating the interpretation distributing system 2000 according to the specific example. In the drawing, the same reference signs as illustrated in FIG. 4 denote the same or corresponding elements. For example, it is assumed that the interpretation distributing system 2000 includes a first interpretation distributing device 12a to a tenth interpretation distributing device 12j as the interpretation distributing device 12. The number of interpretation distributing devices 12 does not matter. The portable information terminals 41 to 44 are information processing terminals which are used by the interpreters T1 to T4, respectively, and can be connected to the interpretation distributing devices 12a to 12j by a radio communication technique such as Bluetooth (registered trademark). The interpretation distributing system 1000 includes a plurality of terminal devices 22, and the plurality of terminal devices 22 are described as a terminal device 22a, a terminal device 22b, and the like. It is assumed that the portable information terminals 41 to 44 and the terminal devices 22 are so-called smartphones.

FIG. 17 is a distribution language management table which is information for managing language identifiers indicating languages of interpreted voice data which is transmitted from the respective interpretation distributing devices 12a to 12j and which is a part of distributing device information stored in the distributing device information storage unit 301. It is assumed that the distribution language management table is in a default state. The distribution language management table has attributes of a "language ID" and a "device ID." The "language ID" is a language identifier. The "device ID" is a device identifier. It is assumed herein that the device identifier is an IP address of an interpretation distributing device 11. In FIG. 17, it is assumed that the IP addresses of the interpretation distributing devices 11a to 11j are arranged from top to bottom. The same is true of FIGS. 18 and 19.

Here, it is assumed that the interpretation distributing devices 12a to 12e receive interpreted voice data in the language of which the language identifier is "English" from the portable information terminal 41 of the interpreter T1 and transmit the interpreted voice data to one or more terminal devices 22, the interpretation distributing devices 12f to 12j receive interpreted voice data in the language of which the language identifier is "Chinese" from the portable information terminal 42 of the interpreter T2 and transmit the interpreted voice data to one or more terminal devices 22, and the distribution language management table is the same as illustrated in FIG. 17.

The control-side language identifier transmitting unit 302 acquires the values of the "language ID" from all the records (rows) of the distribution language management table illustrated in FIG. 17 every predetermined time after the control device 32 is started without overlapping each other, and transmits the acquired language identifiers in correlation with the IP address of the control device 32 in a broadcast manner. Here, the transmitted language identifiers are "English" and "Chinese."

The language identifier receiving unit 221 of each terminal device 22 receives the language identifiers transmitted from the control device 32. The display unit 203 of the terminal device 22a displays a menu in response to an operation of the user A, and the transmission request transmitting unit 225 transmits transmission request information to the control device 32 when the language designation receiving unit 204 receives an operation of designating one language from the user A. It is assumed that the language designated by the user is "English" and the transmitted transmission request information includes a language identifier "English" and an IP address "xxx.xxx.155.123" of the terminal device 22a as a terminal identifier. The process of displaying a menu using the language identifiers, the process of receiving the operation of designating a language, and the like are the same as in the specific example of Embodiment 1 and thus description thereof will not be repeated.

When the transmission request information transmitted from the terminal device 22a is received, the distribution-side transmission request receiving unit 117 of the control device 32 stores the received transmission request information in a storage unit or the like (not illustrated) and the distribution source determining unit 307 determines the interpretation distributing device 12 to transmit interpreted voice data to the terminal device 22a using the transmission request information.

FIG. 18 illustrates a terminal number management table which is a part of the distributing device information stored in the distributing device information storage unit 301 and which is information for managing the terminal number information received from the interpretation distributing devices 12a to 12j. The terminal number management table includes a "terminal number" as the terminal number information and a "device ID" as the device identifier. Here, it is assumed that the terminal number information is stored in advance.

FIG. 19 illustrates a maximum access number management table which is a part of the distributing device information stored in the distributing device information storage unit 301 and which is information for managing the upper limit of the number of terminal devices to which the interpretation distributing devices 12a to 12j can transmit interpreted voice data. The maximum access number management table includes a "maximum number" as the upper limit of the number of terminal devices to which interpreted voice data can be transmitted and a "device ID."

The distribution source determining unit 307 acquires the language identifier "English" of the received transmission request information and acquires the "device ID" of the record (row) in which the "language ID" matches "English" in the distribution language management table illustrated in FIG. 17. For each of the acquired "device IDs," the "terminal number" corresponding to the "device ID" and the "maximum number" are acquired from the terminal number management table illustrated in FIG. 18 and the maximum access number management table illustrated in FIG. 19, and the value of the "terminal number" is divided by the value of the "maximum number." The "device ID" in which the value of the "device ID" is the minimum is detected. When the same values are present, for example, the "device ID" appearing earliest in the arrangement order in any management table is acquired. Here, since the smallest value obtained by dividing the "terminal number" in which the "device ID" is "xxx.xxx.112.011" by the "maximum number" is "0.81," the interpretation distributing device 12a indicated by the device identifier "xxx.xxx.112.011" is determined as the interpretation distributing device 12 as a distribution source.

The distribution processing unit 308 transmits the control-side transmission request information including the language identifier "English" and the terminal identifier "xxx.xxx.155.123" of the transmission request information to the interpretation distributing device 12a indicated by the device identifier "xxx.xxx.112.011."

When the control-side transmission request information is received from the control device 32, the distribution-side transmission request receiving unit 117 of the interpretation distributing device 12a stores the received control-side transmission request information in a storage unit that is not illustrated.

For example, it is assumed that the interpretation distributing devices 12 receive interpreted voice data of the languages corresponding to the language identifiers in the distribution language management table illustrated in FIG. 17 from any one of the portable information terminals 41 to 44 of the interpreters, for example, in a default state. For example, it is assumed that the interpretation distributing device 12a receives interpreted voice data of which the language is "English" from the portable information terminal 41 of the interpreter.

For example, the interpretation distributing device 12 includes the language identifier management table described with reference to FIG. 5 in the specific example in a storage unit or the like (not illustrated) in advance. When the interpreted voice acquiring unit 111 receives interpreted voice data correlated with the interpreter identifier from the portable information terminal 41 similarly to the above-mentioned specific example, the interpretation distributing device acquires the language identifier correlated with the interpreter identifier from the language identifier management table, detects the control-side transmission request information including the same language identifier as the acquired language identifier from the control-side transmission request information which is received and stored by the distribution-side transmission request receiving unit 117, and transmits the interpreted voice data to one or more terminal devices 22 indicated by the terminal identifier of the detected control-side transmission request information. For example, when the language identifier acquired using the interpreter identifier correlated with the interpreted voice data is "English," the interpreted voice data is also transmitted to the terminal device 22a.

The subsequent process of outputting the interpreted voice data in the terminal device 22a or the like is the same as in the above-mentioned specific example and thus detailed description thereof will not be repeated. The process of recording the interpreted voice data or the like is the same as the above-mentioned process and thus detailed description thereof will not be repeated.

For example, when a predetermined time elapses after each interpretation distributing device 12 is started, the terminal number acquiring unit 108 of the interpretation distributing device 12 counts the number of terminal devices to which the interpreted voice transmitting unit 112 transmits the interpreted voice data and acquires the terminal number information. The terminal number transmitting unit 109 transmits the terminal number information acquired by the terminal number acquiring unit 108 in correlation with the device identifier. It is assumed that the device identifier is the IP address of the interpretation distributing device 11.

When the terminal number receiving unit 303 receives the terminal number information correlated with the device identifier from the interpretation distributing device 12, the terminal number information and the device identifier are correlated and added to the distributing device information stored in the distributing device information storage unit 301. For example, the terminal number management table illustrated in FIG. 18 is updated.

For example, it is assumed that a predetermined time elapses after each interpretation distributing device 12 is started and it is time to determine a language of interpreted voice data to be transmitted from each interpretation distributing device 12. That is, this process may be considered to be a process of changing assignment of languages of interpreted voice data to be transmitted from the interpretation distributing devices 12.

The distribution language determining unit 305 detects records having the same "language ID" from the distribution language management table illustrated in FIG. 17, and acquires sets of a value of the "language ID" and a value of one or more "device IDs" for each record having the same "language ID." For each set, the values of the "terminal number" corresponding to one or more "device IDs" are acquired from the terminal number management table illustrated in FIG. 18 and the total sum thereof is acquired. For example, the total sum of the "terminal number" acquired for the set in which the "language ID" is "English" is "249." The total sum of the "terminal number" acquired for the set in which the "language ID" is "Chinese" is "33." That is, the number of terminal devices 22 is counted for each language.

The distribution language determining unit 305 assigns the language identifiers to the interpretation distributing devices 12a to 12j to be as close as possible to the ratio of the total sum of the "terminal number" acquired for each "language ID." At least one interpretation distributing device 12 is assigned to the "language ID" for which the total number is equal to or greater than one. For example, the ratio of "Chinese" to "English" is "39" to "249" and the number of language IDs "Chinese" is smaller. Accordingly, the ratio of the terminal number of "Chinese" is calculated to be 39÷(249+39)=0.13. By multiplying the calculated value by the total number "10" of interpretation distributing devices 12, "1.3" is obtained. "2" which is obtained by rounding up from the decimal point is determined as the number of interpretation distributing devices 12 which transmit interpreted voice data in a language of which the language identifier is "Chinese." The other eight interpretation distributing devices 12 are set as the interpretation distributing devices 12 which transmit interpreted voice data in a language of which the language identifier is "Chinese." On the basis of the calculated numbers, the languages of the interpreted voice data to be transmitted are assigned to the interpretation distributing devices 12a to 12j. Specifically, the language identifiers are correlated with the device identifiers of the interpretation distributing devices 12a to 12j. The assignment method is not particularly limited. For example, eight interpretation distributing devices 12a to 12h are set as the interpretation distributing devices 12 distributing "English" and two interpretation distributing devices 12i and 12j are set as the interpretation distributing devices 12 distributing "Chinese." The distribution language management table of the distributing device information is updated based on the determined information.

FIG. 20 is a diagram illustrating an updated distribution language management table.

The distribution language instruction transmitting unit 306 transmits a distribution language instruction including the value of the "language ID" in each record (row) of the distribution language management table illustrated in FIG. 20 to the interpretation distributing device 12 indicated by the "device ID" in the same record.

For example, when the distribution language instruction receiving unit 110 of the interpretation distributing device 12a of which the device identifier is "xxx.xxx.112.011" receives a distribution language instruction including the language identifier "English," a transmitting unit or the like (not illustrated) of the interpretation distributing device 12 acquires the interpreter identifier corresponding to the language identifier "English" from the language identifier management table illustrated in FIG. 5 or the like. By requesting transmission of interpreted voice data of which the language identifier is "English" from the information processing device (not illustrated) of the interpreter indicated by the interpreter identifier, the interpretation distributing device 12a can receive the interpreted voice data determined by the distribution language determining unit 305 and can transmit the interpreted voice data to the terminal devices 22.

By performing the same process on the interpretation distributing devices 12b to 12j, eight interpretation distributing devices 12a to 12h are set as the interpretation distributing devices 12 transmitting "English" and two interpretation distributing devices 12i and 12j are set as the interpretation distributing devices 12 transmitting "Chinese." Accordingly, it is possible to increase or decrease the number of interpretation distributing devices 12 transmitting each language depending on the number of pieces of interpreted voice data for each language. For example, by increasing or decreasing the number of interpretation distributing devices 12 transmitting each language depending on the ratio of the language, it is possible to predict demand for interpreted voice data for each language and to assign the optimal languages to the interpretation distributing devices 12.

As described above, the control device 32 performs the process of determining the interpretation distributing device 12 as a transmission source of the terminal device 22 having transmitted the control request information or the like on the assigned interpretation distributing devices 12.

Since the interpreted voice data which is transmitted from each interpretation distributing device 12 is changed, it is necessary to change the interpreted voice data as a transmission source of the interpreted voice data which is transmitted to the terminal devices 22. In this case, for example, using the transmission request information which is received from the terminal devices 22 and stored in a storage unit or the like (not illustrated) by the distribution-side transmission request receiving unit 117 of the control device 32, the distribution source determining unit 307 performs the above-mentioned process again to determine the interpretation distributing device 12 transmitting the interpreted voice data in the language of the transmission request information, and the distribution processing unit 308 transmits the control-side transmission request information to the determined interpretation distributing device 12, whereby the interpreted voice data in the language indicated by the transmission request information transmitted from the terminal devices can be transmitted to the terminal devices 22. In this case, the existing distribution destination of the interpreted voice data may not be changed for the interpretation distributing device 12 in which the language is not changed.

The menu constructing unit 202 may determine the order of languages arranged in the menu depending on the number of terminal devices to which the interpretation distributing device 12 transmits interpreted voice data. For example, the language identifier receiving unit 221 may acquire the total sum of the values of the terminal number information correlated with the device identifier corresponding to the language identifiers along with two or more language identifiers from the control device 32 and may construct a menu in which menu items corresponding to the languages indicated by the language identifiers are arranged sequentially from the menu item correlated with the largest number of terminal devices. For example, a menu in which menu items are arranged sequentially from top to bottom from the menu item correlated with the largest number of terminal devices may be constructed.

According to this embodiment, the interpretation distributing devices 12 transmitting interpreted voice data to the terminal devices 22 can be appropriately assigned by the control device 32.

According to this embodiment, it is possible to appropriately assign the languages of interpreted voice data which are transmitted by the interpretation distributing devices 12.

In the above-mentioned embodiments, the processes (functions) may be realized by centralized processing by a single device (system) or may be realized by distributed processing by a plurality of devices.

In the above-mentioned embodiments, two or more communication means (such as the interpreted voice transmitting unit and the language identifier transmitting unit) which are present in a single device may be realized physically by a single medium.

In the above-mentioned embodiments, the elements may be constituted by dedicated hardware and the elements which can be embodied by software may be realized by executing a program. For example, the elements can be realized by causing a program-executing unit such as an MPU to read and execute a software program recorded on a recording medium such as a hard disk or a semiconductor memory. At the time of execution, the program executing unit may execute the program while accessing a storage unit (for example, a recording medium such as a hard disk or a memory).

The software for realizing the interpretation distributing device in the above-mentioned embodiments is the following program. That is, the program is a program causing a computer to serve as: an interpreted voice acquiring unit that acquires at least one piece of interpreted voice data of two or more pieces of interpreted voice data which are voice data obtained by interpreting voice in a first language into voice in two or more different languages; and an interpreted voice transmitting unit that transmits at least one piece of the interpreted voice data acquired by the interpreted voice acquiring unit to one or more terminal devices.

The program for realizing the control device in the above-mentioned embodiments is a program causing a computer, which is able to access a distributing device information storage unit storing distributing device information which is information on a plurality of interpretation distributing devices, to serve as: a control-side transmission request receiving unit that receives transmission request information including a language identifier which is an identifier of a language and a terminal identifier of a terminal device from two or more terminal devices; a distribution source determining unit that determines the interpretation distributing device transmitting interpretation voice data, which is interpreted into the language indicated by the language identifier of the transmission request information received by the control-side transmission request receiving unit, as the interpretation voice data acquired by interpreting voice in a first language using the distributing device information; and a distribution processing unit that performs a process of transmitting the interpreted voice data interpreted into the language indicated by the language identifier of the transmission request information from the interpretation distributing device determined by the distribution source determining unit to the terminal device indicated by the terminal identifier of the transmission request information.

The program for realizing the terminal device in the above-mentioned embodiments is a program causing a computer to serve as: a language identifier receiving unit that receives language identifiers of interpreted voice data in two or more languages transmitted by one or more interpretation distributing devices transmitting the interpreted voice data which is voice data into which voice in a first language is interpreted; a menu constructing unit that constructs a menu for designating the language of the received interpreted voice data using two or more language identifiers received by the language identifier receiving unit; a display unit that displays the menu constructed by the menu constructing unit; a language designation receiving unit that receives an operation of designating a language to be heard using the menu constructed by the menu constructing unit; an interpreted voice receiving unit that receives the interpreted voice data in the language to be heard designated by the operation received by the language designation receiving unit; and an interpreted voice output unit that outputs the interpreted voice data in the language to be heard received by the interpreted voice receiving unit.

In the program, the functions which are realized by the program do not include the functions which can only be realized by hardware. For example, the functions which can only be realized by hardware such as a modem and an interface card in acquisition of information by an acquisition unit, output of information by an output unit, and the like are not included in the functions which are realized by the program.

The number of computers executing the program may be one or two or more. That is, centralized processing may be performed or distributed processing may be performed.

Figure 21:
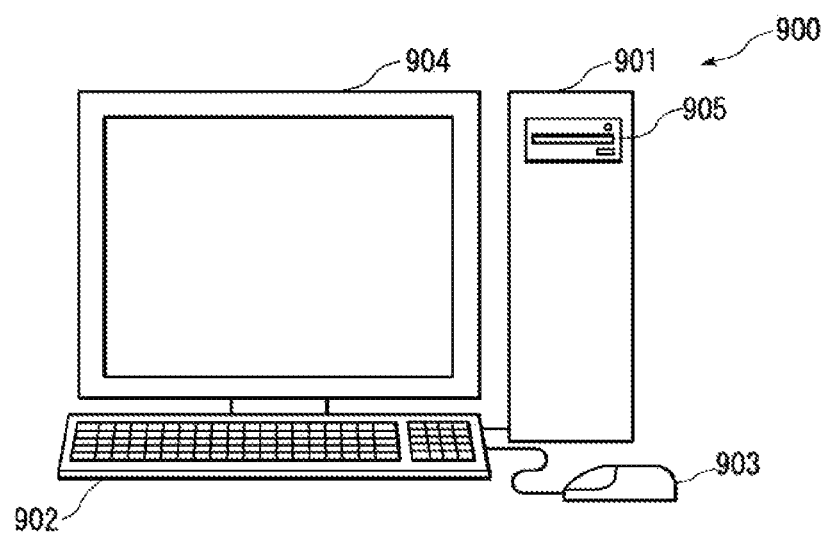
FIG. 21 is a diagram illustrating an example of an appearance of a computer system according to the embodiments of the present invention.

FIG. 21 is a diagram schematically illustrating an appearance example of a computer that realizes the interpretation distributing device, the terminal device, and the control device according to the above-mentioned embodiments by executing a program. The above-mentioned embodiments can be embodied by computer hardware and a computer program which is executed by the computer hardware.

In FIG. 21, the computer system 900 includes a computer 901 including a compact disk read only memory (CD-ROM) drive 905, a keyboard 902, a mouse 903, and a monitor 904.

Figure 22:
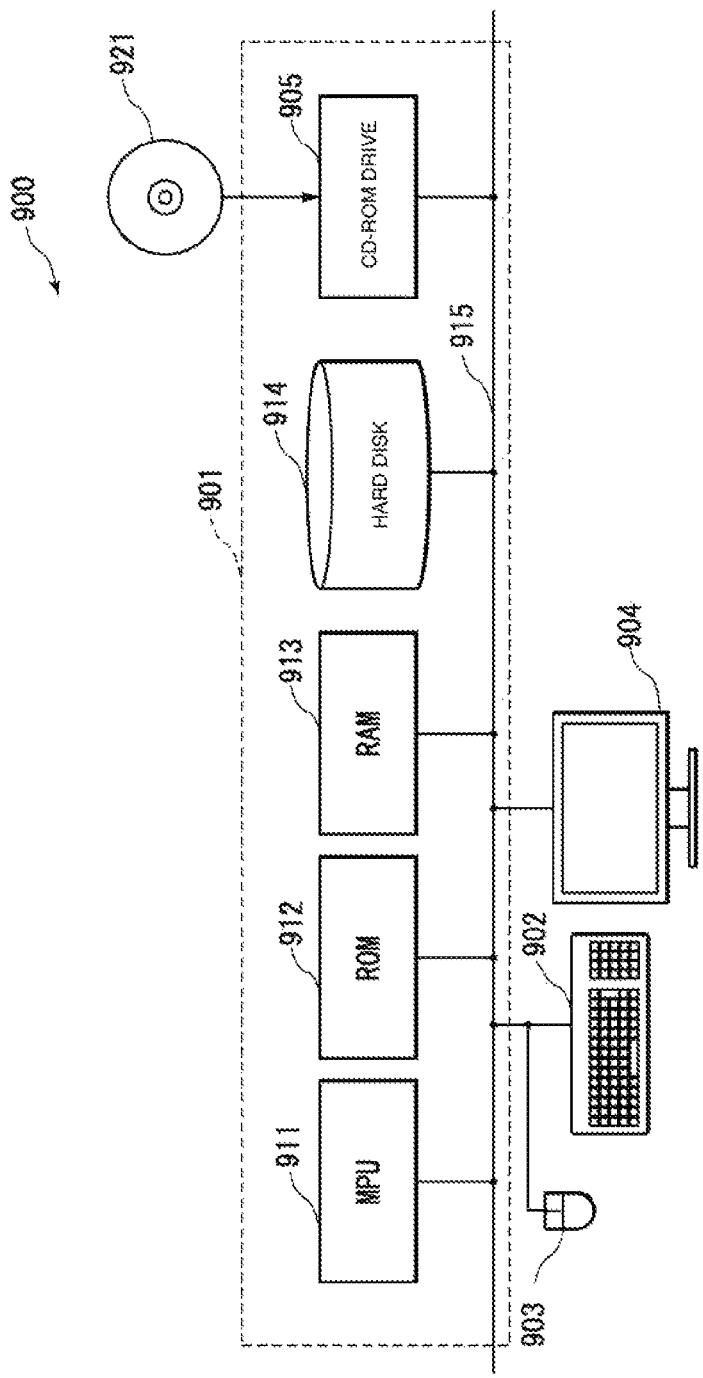
FIG. 22 is a diagram illustrating an example of a configuration of the computer system.

FIG. 22 is a diagram illustrating an internal configuration of the computer system 900. In FIG. 22, in addition to the CD-ROM drive 905, the computer 901 includes a micro processing unit (MPU) 911, a ROM 912 that stores programs such as a boot-up program, a random access memory (RAM) 913 that is connected to the MPU 911, temporarily stores commands of an application program, and provides a temporary storage space, a hard disk 914 that stores an application program, a system program, and data, and a bus 915 connecting the MPU 911, the ROM 912, and the like to each other. The computer 901 may include a network card (not illustrated) providing access to a LAN.

A program causing the computer system 900 to execute the functions of the interpretation distributing device and the like according to the above-mentioned embodiments may be stored in a CD-ROM 921 which is inserted into a CD-ROM drive 905 and may be transmitted to the hard disk. Instead, the program may be transmitted to the computer 901 via a network that is not illustrated and may be stored in the hard disk 914. The program is loaded into the RAM 913 at the time of execution. The program may be directly loaded from the CD-ROM 921 or the network.

The program may not necessarily include an operating system (OS) for executing the functions of the interpretation distributing device according to the above-mentioned embodiments, a third party program, or the like. The program may include only a part of a command for calling an appropriate function (module) under control to obtain a desired result. How the computer system 900 operates is well known and detailed description thereof will not be made.

The present invention is not limited to the above-mentioned embodiments, but can be modified in various forms and the modifications are included in the scope of the present invention.

As described above, the interpretation distributing system and the like according to the present invention can be suitably used as a system and the like for transmitting interpreted voice data and is useful as a system and the like for transmitting voice data which has been interpreted into a plurality of languages.

The invention claimed is:

1. A control device comprising:
    a control-side transmission request receiver receiving transmission request information including a language identifier which is an identifier of a language and a terminal identifier of a terminal device from two or more terminal devices;
    a distributing device information storage distributing device information which is information on a plurality of interpretation distributing devices;
    a distribution source determining unit that determines a total number of terminals to which each interpretation distributing device transmit the interpreted voice data, and selects the interpretation distributing device with a minimum total number of terminals to transmit interpretation voice data, wherein the interpretation voice data is interpreted into the language indicated by the language identifier of the transmission request information received by the control-side transmission request receiving unit, as the interpretation voice data acquired by interpreting voice in a first language using the distributing device information; and
    a distribution processing unit that performs a process of transmitting the interpreted voice data interpreted into the language indicated by the language identifier of the transmission request information from the interpretation distributing device selected by the distribution source determining unit to the terminal device indicated by the terminal identifier of the transmission request information.

2. The control device according to claim 1, wherein the distribution source determining unit determines the interpretation distributing device transmitting the interpreted voice data to the terminal device indicated by the terminal identifier of the transmission request information, among predetermined interpretation distributing devices transmitting the interpreted voice data in the language indicated by the language identifier of the transmission request information received by the control-side transmission request receiver out of the plurality of interpretation distributing devices, using the distributing device information.

3. The control device according to claim 1, further comprising:
    a distribution language determining unit that determines the language of the interpreted voice data transmitted by the plurality of interpretation distributing devices using the distributing device information and stores information indicating the language of the interpreted voice data transmitted by the interpretation distributing devices in the distributing device information; and
    a language determination processing unit that performs a process of transmitting the interpreted voice data in the language determined by the distribution language determining unit to the plurality of interpretation distributing devices,
    wherein the distribution source determining unit determines the interpretation distributing device transmitting the interpreted voice data to the terminal device indicated by the terminal identifier of the transmission request information among one or more interpretation distributing devices transmitting the interpreted voice data in the language indicated by the language identifier of the transmission request information received by the control-side transmission request receiving unit using the distributing device information stored by the distribution language determining unit.

* * * * *